US010536916B2

(12) United States Patent
Yoshizawa

(10) Patent No.: US 10,536,916 B2
(45) Date of Patent: Jan. 14, 2020

(54) COMMUNICATION CONTROL DEVICE, PROGRAM, AND COMMUNICATION CONTROL METHOD

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/245,737

(22) Filed: Aug. 24, 2016

(65) Prior Publication Data

US 2016/0366661 A1 Dec. 15, 2016

Related U.S. Application Data

(63) Continuation of application No. 14/430,126, filed as application No. PCT/JP2013/076104 on Sep. 26, 2013, now Pat. No. 9,461,899.

(30) Foreign Application Priority Data

Dec. 3, 2012 (JP) .................................. 2012-264137

(51) Int. Cl.
*H04W 56/00* (2009.01)
*H04L 12/26* (2006.01)
(Continued)

(52) U.S. Cl.
CPC ........... *H04W 56/0045* (2013.01); *H04L 5/14* (2013.01); *H04L 43/0852* (2013.01);
(Continued)

(58) Field of Classification Search
CPC .................................................. H04L 43/0852
See application file for complete search history.

(56) References Cited

U.S. PATENT DOCUMENTS

2006/0166688 A1* 7/2006 Sun ...................... H04B 7/2681
455/502
2006/0245398 A1* 11/2006 Li ........................ H04B 7/2668
370/335
(Continued)

FOREIGN PATENT DOCUMENTS

JP 2006-522534 A 9/2006
JP 2010-279042 A 12/2010
(Continued)

OTHER PUBLICATIONS

International Search Report dated Nov. 19, 2013 in PCT/JP2013/076104.
(Continued)

*Primary Examiner* — John D Blanton
(74) *Attorney, Agent, or Firm* — Xsensus LLP

(57) ABSTRACT

There is provided a communication control device including an acquisition unit configured to acquire a reception timing at which a second radio communication device receives a downlink signal from a base station performing radio communication with a first radio communication device or the second radio communication device, and a decision unit configured to decide a transmission timing at which the second radio communication device transmits a signal to the first radio communication device through inter-device communication based on the reception timing. The decided transmission timing is a timing later than a timing at which the second radio communication device transmits an uplink signal.

12 Claims, 28 Drawing Sheets

(51) Int. Cl.
*H04W 24/08* (2009.01)
*H04W 72/04* (2009.01)
*H04L 5/14* (2006.01)
*H04W 84/12* (2009.01)
*H04L 27/26* (2006.01)

(52) U.S. Cl.
CPC ....... *H04W 24/08* (2013.01); *H04W 56/0065* (2013.01); *H04W 72/0446* (2013.01); *H04L 27/2656* (2013.01); *H04W 84/12* (2013.01)

(56) References Cited

U.S. PATENT DOCUMENTS

| | | | |
|---|---|---|---|
| 2011/0106952 A1* | 5/2011 | Doppler | H04W 72/0406 709/226 |
| 2011/0268101 A1 | 11/2011 | Wang et al. | |
| 2011/0275382 A1* | 11/2011 | Hakola | H04W 24/10 455/452.2 |
| 2012/0106517 A1* | 5/2012 | Charbit | H04W 72/04 370/336 |
| 2012/0258706 A1* | 10/2012 | Yu | H04W 56/0045 455/426.1 |
| 2012/0269178 A1* | 10/2012 | Li | H04W 56/0045 370/336 |
| 2014/0086153 A1 | 3/2014 | Bontu | |
| 2014/0355557 A1* | 12/2014 | Peng | H04W 16/14 370/330 |
| 2015/0304902 A1* | 10/2015 | Yu | H04W 36/165 455/436 |
| 2016/0212793 A1 | 7/2016 | Jung et al. | |

FOREIGN PATENT DOCUMENTS

| | | |
|---|---|---|
| JP | 2017-103781 A | 6/2017 |
| WO | 2004/073209 A1 | 8/2004 |
| WO | 2004/091238 A1 | 10/2004 |
| WO | WO 2010/108549 A1 | 9/2010 |
| WO | 2013/123674 A1 | 8/2013 |

OTHER PUBLICATIONS

Extended European Search Report dated Jun. 28, 2016 in Patent Application No. 13860185.1.
Extended European Search Report dated Feb. 1, 2017 in Patent Application No. 16194609.0.
Chinese Office Action dated Feb. 9, 2018 in Chinese Application No. 201380061720.2 w/English Translation.
Notification of Reason(s) for Refusal issued in Japanese Application 2017-158325 dated Jul. 3, 2018.
Intel Corporation, "Resource Allocation for D2D Discovery", 3GPP TSG-RAN2 Meeting #83bis R2-133512, 3GPP, 5 Pages total, (Oct. 7-11, 2013).

* cited by examiner

COMMUNICATION CONTROL DEVICE, PROGRAM, AND COMMUNICATION CONTROL METHOD

CROSS REFERENCE TO RELATED APPLICATION

The present continuation application claims the benefit of priority under U.S.C. § 120 to U.S. application Ser. No. 14/430,126, filed on Mar. 20, 2015, which was the National Stage of International Application No. PCT PCT/JP2013/076104, filed on Sep. 26, 2013, and claims the benefit of priority under 35 U.S.C. § 119 from Japanese Application No. 2012-264137, filed on Dec. 3, 2012. The entire contents of all of which are hereby incorporated herein by reference in its entirety.

TECHNICAL FIELD

The present disclosure relates to a communication control device, a program, and a communication control method.

BACKGROUND ART

Near field inter-terminal communication or device-to-device communication (D2D communication) is a communication form in which a signal is directly transmitted between terminal devices, unlike a communication form in which a signal passes through a base station in cellular communication. Therefore, in the D2D communication, new use forms of terminal devices unlike the existing cellular communication are expected to appear. For example, various applications such as information sharing by data communication between near terminal devices or a group of near terminal devices, information distribution from installed terminal devices, and autonomous communication between devices called Machine to Machine (M2M) can be considered.

With regard to the significant increase in data traffic with the recent increase of smartphones, the D2D communication can also be considered to be utilized in off-loading of data. In recent years, for example, demands for transmission and reception of streaming data of moving images have rapidly increased. However, since moving images generally have large data amounts, the moving images have a problem in that they consume many resources in a Radio Access Network (RAN). Accordingly, when terminal devices are in a state suitable for the D2D communication such as a case in which a distance between terminal devices is small, resource consumption and process loads in the RAN can be suppressed by off-loading moving image data in the D2D communication. Thus, the D2D communication is useful for both communication providers and users. Therefore, at present, the D2D communication is recognized and noticed as one of the important technical areas necessary for Long Term Evolution (LTE) of the 3rd Generation Partnership Project (3GPP) standardization commission as well.

In the related art, as disclosed in the following patent literature, communication schemes such as Bluetooth (registered trademark) and WiFi (registered trademark) have been adopted in the D2D communication and combinations of such communication schemes and communication schemes of cellular communication such as Wideband Code Division Multiple Access (WCDMA) (registered trademark) and LTE have been combined as an example.

CITATION LIST

Patent Literature

Patent Literature 1: JP 2010-279042A

SUMMARY OF INVENTION

Technical Problem

However, when the same communication scheme as the communication scheme (for example, LTE) of the cellular communication is adopted in the D2D communication and the cellular communication and the D2D communication are not properly combined, transmission and reception of signals in the D2D communication may be obstructed. Specifically, for example, since a distance between terminal devices at the time of the D2D communication is less than a distance between a base station and a terminal device, propagation delay in the D2D communication is less than propagation delay in cellular communication. For this reason, when the terminal device does not transmit a signal of the D2D communication in consideration of transmission and reception timings in cellular communication, there is a possibility of the signal of the D2D communication not being properly received.

Accordingly, it is desirable to provide a structure capable of improving a possibility of a signal being properly received in D2D communication in which the same communication scheme as a communication scheme of cellular communication is adopted.

Solution to Problem

According to the present disclosure, there is provided a communication control device including an acquisition unit configured to acquire a reception timing at which a second radio communication device receives a downlink signal from a base station performing radio communication with a first radio communication device or the second radio communication device, and a decision unit configured to decide a transmission timing at which the second radio communication device transmits a signal to the first radio communication device through inter-device communication based on the reception timing. The decided transmission timing is a timing later than a timing at which the second radio communication device transmits an uplink signal.

According to the present disclosure, there is provided a program causing a computer to function as an acquisition unit configured to acquire a reception timing at which a second radio communication device receives a downlink signal from a base station performing radio communication with a first radio communication device or the second radio communication device, and a decision unit configured to decide a transmission timing at which the second radio communication device transmits a signal to the first radio communication device through inter-device communication based on the reception timing. The decided transmission timing is a timing later than a timing at which the second radio communication device transmits an uplink signal.

According to the present disclosure, there is provided a communication control method including acquiring a reception timing at which a second radio communication device receives a downlink signal from a base station performing radio communication with a first radio communication device or the second radio communication device, and deciding a transmission timing at which the second radio communication device transmits a signal to the first radio communication device through inter-device communication based on the reception timing. The decided transmission timing is a timing later than a timing at which the second radio communication device transmits an uplink signal.

Advantageous Effects of Invention

According to an embodiment of the present disclosure described above, it is possible to improve a possibility of a signal being properly received in D2D communication in which the same communication scheme as a communication scheme of cellular communication is adopted.

DESCRIPTION OF EMBODIMENTS

Figure 1:
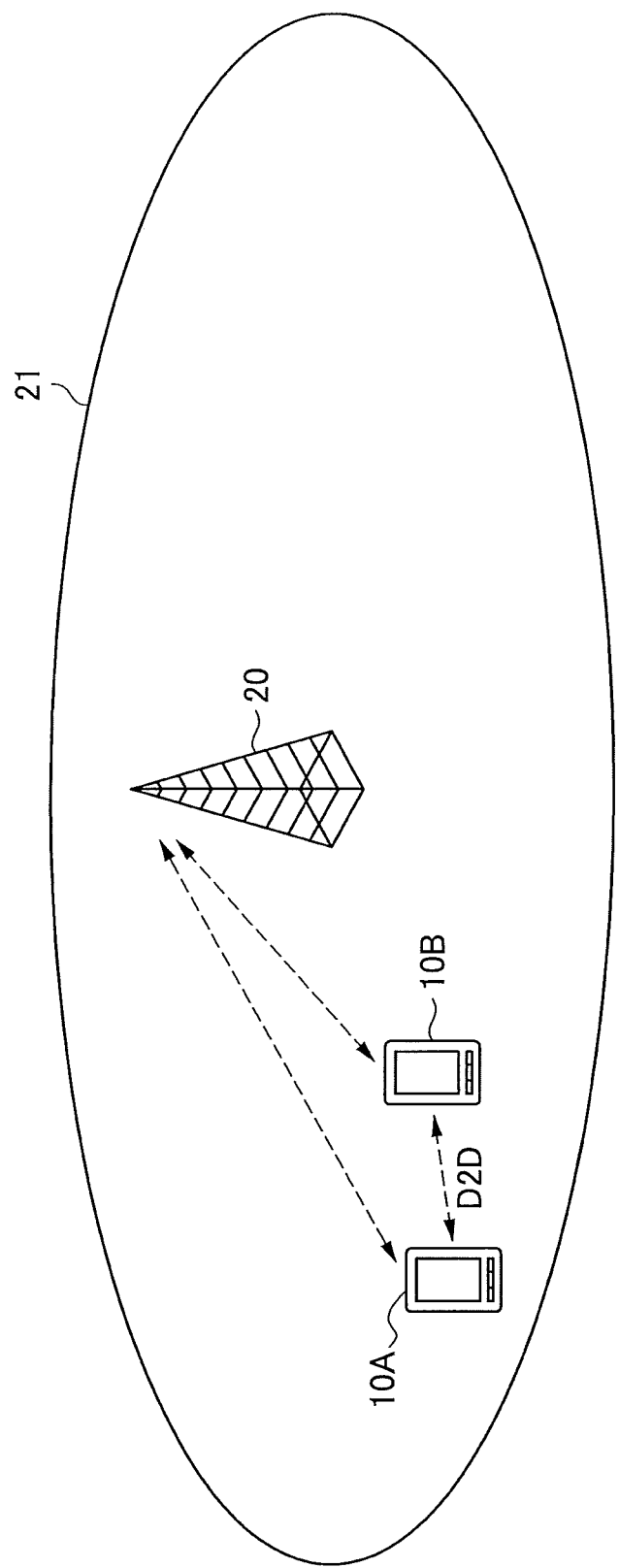
FIG. 1 is an explanatory diagram illustrating an example of a radio communication system which is a premise of description of FIGS. 2 to 7.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
1.1. Transmission and reception timings of signals in cellular communication scheme
1.2. Technical problem in D2D communication
2. Schematic configuration of radio communication system
3. Configuration of terminal device
4. Flow of process
5. Modification examples
6. Introduction
6.1. Application to terminal device
6.2. Application to base station
7. Conclusion

1. INTRODUCTION

First, transmission and reception timings of signals in a cellular communication scheme and a technical problem in D2D communication will be described with reference to FIGS. 1 to 9.

<1.1. Transmission and Reception Timings of Signals in Cellular Communication Scheme>

Transmission and reception timings of signals in a cellular communication scheme will be described with reference to FIGS. 1 to 7. Here, the timings of the transmission and reception of the signals in, for example, LTE will be described.

(Configuration of Radio Communication System)

FIG. 1 is an explanatory diagram illustrating an example of a radio communication system which is a premise of description of FIGS. 2 to 7. Terminal devices 10 and a base station 20 are illustrated in FIG. 1. The terminal device 10 is referred to user equipment (UE) and the base station 20 is referred to as an evolved node B (eNB). A cell 21 formed by the base station 20 is also illustrated. In such a radio communication system, radio communication is performed as cellular communication between each terminal device 10 and the base station 20. Radio communication is performed as D2D communication between the terminal devices 10. For example, the terminal devices 10A and 10B perform the D2D communication.

In this example, the terminal device 10A is located to be more distant than the terminal device 10B from the base station 20. That is, a distance between the terminal device 10A and the base station 20 is longer than a distance between the terminal device 10B and the base station 20.

(Signal in LTE)
Downlink

In LTE, Orthogonal Frequency Division Multiplexing (OFDM) is adopted in a downlink. Fourteen OFDM symbols are transmitted for each of the subframes which are units of times of radio communication. Hereinafter, a specific example of this point will be described with reference to FIG. 2.

Figure 2:
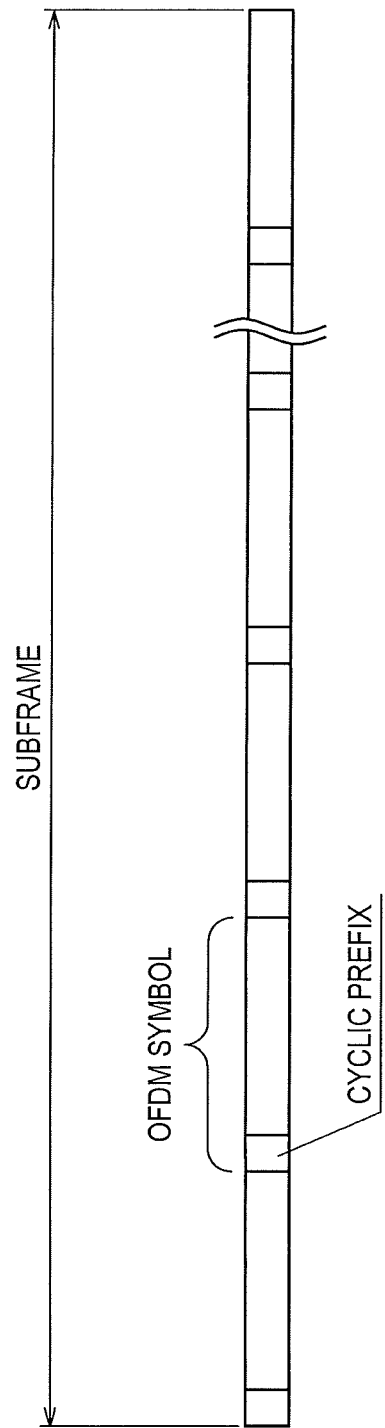
FIG. 2 is an explanatory diagram illustrating a downlink signal transmitted in radio communication according to LTE.

FIG. 2 is an explanatory diagram illustrating a downlink signal transmitted in radio communication according to LTE. A downlink signal transmitted with one subframe in radio communication according to LTE is illustrated in FIG. 2. In LTE, fourteen OFDM symbols are generally included in one subframe. In other words, one subframe includes two slots and one slot includes seven OFDM symbols. Each OFDM symbol includes a cyclic prefix (CP) in its beginning.

The CP is a guard interval for removing inter-symbol interference in which a delay wave of the OFDM symbol has an influence on the subsequent OFDM symbol. The CP is generated, for example, by copying signal corresponding to a predetermined time of the last end of the OFDM symbol. A terminal device receiving the OFDM symbol neglects the signal of the CP in the OFDM symbol and demodulates the remaining signals of the OFDM symbol. The cyclic prefix contributes to removal of inter-subcarrier interference.

In the case of a normal cyclic prefix, the length of the OFDM symbol is about 66.67 microseconds. The length of the cyclic prefix included in the beginning of each symbol is about 4.687 microseconds.

Uplink

In LTE, on the other hand, a Single Carrier Frequency Division Multiple Access (SC-FDMA) is adopted in an uplink. The SC-FDMA symbol is transmitted in a time direction. The SC-FDMA symbol also includes a CP as in the OFDM symbol.

(Transmission and Reception Timings of Signals)
Downlink

In a downlink of LTE, the base station 20 transmits a downlink signal simultaneously at a certain frame timing. That is, the base station 20 transmits the downlink signal to each terminal device 10 at the same timing. This is because resource blocks for transmitting data destined for the terminal devices 10 are subjected to signal processing in parallel at the same frame timing and the resource blocks are transmitted simultaneously from an antenna after amplification in the base station 20.

On the other hand, the terminal device 10 receives a downlink signal after propagation delay according to a distance between the terminal device 10 and the base station 20 rather than the frame timing. A specific example of this point will be described with reference to FIGS. 3 and 4.

Figure 3:
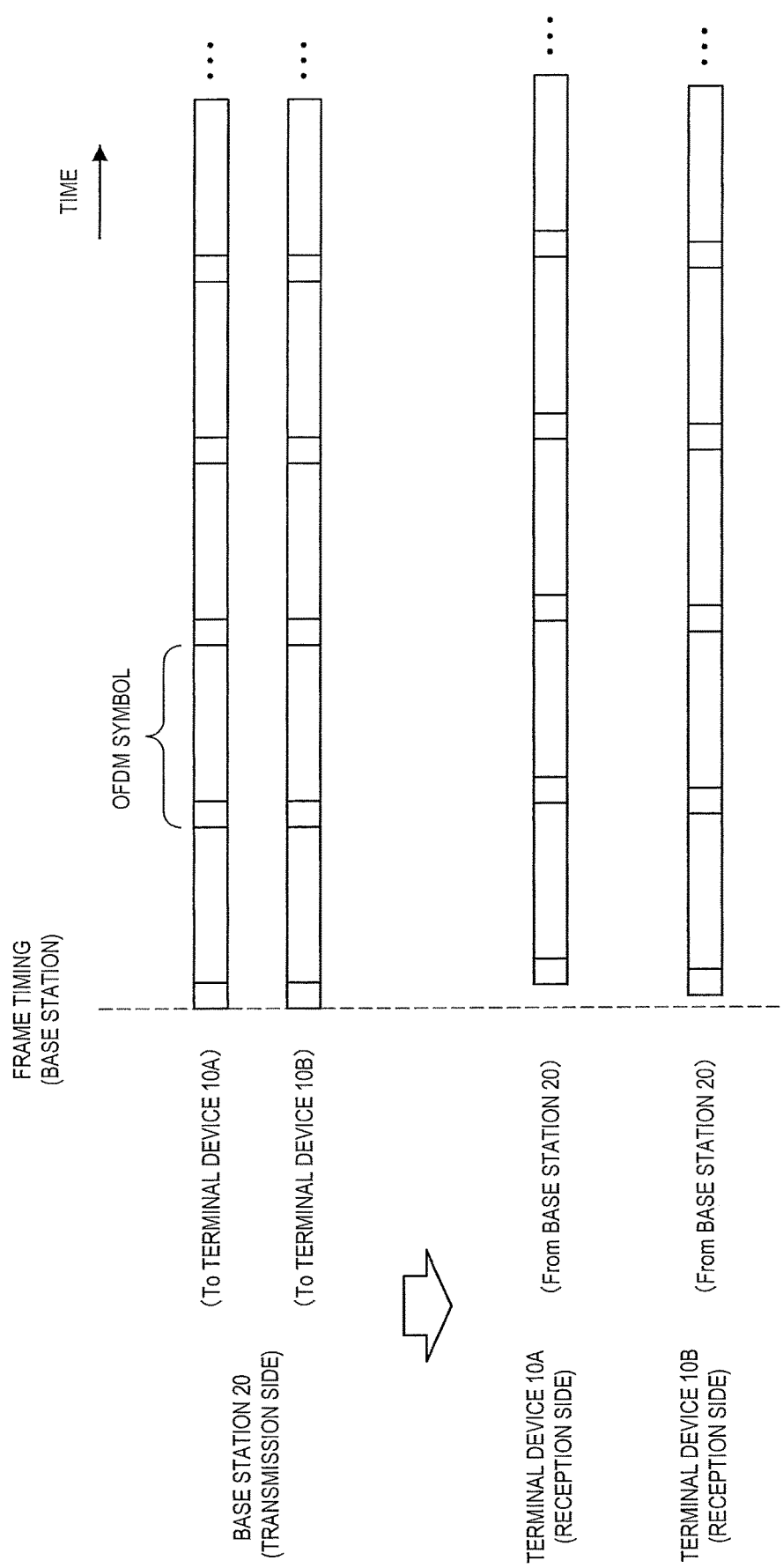
FIG. 3 is an explanatory diagram schematically illustrating an example of timings at which terminal devices receive downlink signals.

FIG. 3 is an explanatory diagram schematically illustrating an example of timings at which terminal devices receive the downlink signals. Timings at which the base station 20 transmits downlink signals to the terminal devices 10A and 10B with the subframes are illustrated in FIG. 3. Thus, the base station 20 transmits the downlink signals simultaneously at a certain frame timing. Further, timings at which the terminal devices 10A and 10B receive the downlink signals are also illustrated in FIG. 3. Thus, the terminal devices 10A and 10B start receiving the downlink signal later than the frame timing.

Figure 4:
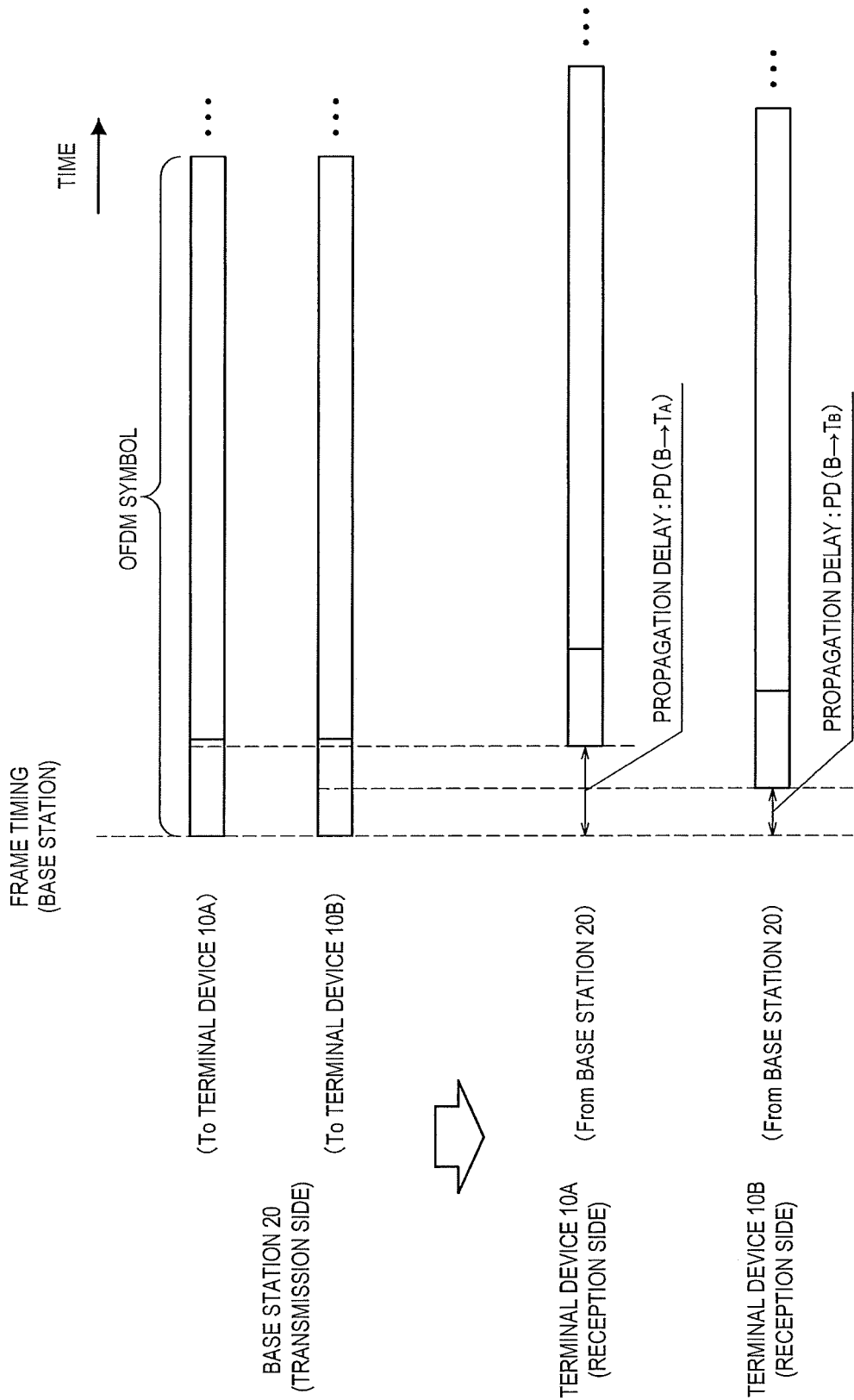
FIG. 4 is an explanatory diagram illustrating the details of the example of timings at which the terminal devices receive the downlink signals.

FIG. 4 is an explanatory diagram illustrating the details of an example of timings at which the terminal devices receive the downlink signals. The timings at which the terminal devices 10A and 10B illustrated in FIG. 3 receive the downlink signals are illustrated in more detail in FIG. 4. In this example, as illustrated in FIG. 1, the terminal device 10A is more distant from the base station 20 than the terminal device 10B. Therefore, propagation delay PD $(B \rightarrow T_A)$ in a path from the base station 20 to the terminal device 10A is greater than propagation delay PD $(B \rightarrow T_B)$ in a path from the base station 20 to the terminal device 10B. That is, "PD $(B \rightarrow T_A)$>PD $(B \rightarrow T_B)$" is satisfied. Accordingly, a timing at which the terminal device 10A starts receiving the downlink signal is later than a timing at which the terminal device 10B starts receiving the downlink signal. Thus, the reception timing of the downlink signal of the terminal device 10 is decided depending on where the terminal device 10 is located within the cell 21.

Uplink

In an uplink of LTE, the base station 20 receives uplink signals simultaneously at a given frame timing. That is, the base station 20 receives the uplink signals from the respective terminal devices 10 at the same timing.

On the other hand, the terminal device 10 starts transmitting the uplink signal earlier than the frame timing rather than the frame timing in consideration of the propagation delay according to the distance between the terminal device 10 and the base station 20. A specific example of this point will be described with reference to FIGS. 5 and 6.

Figure 5:
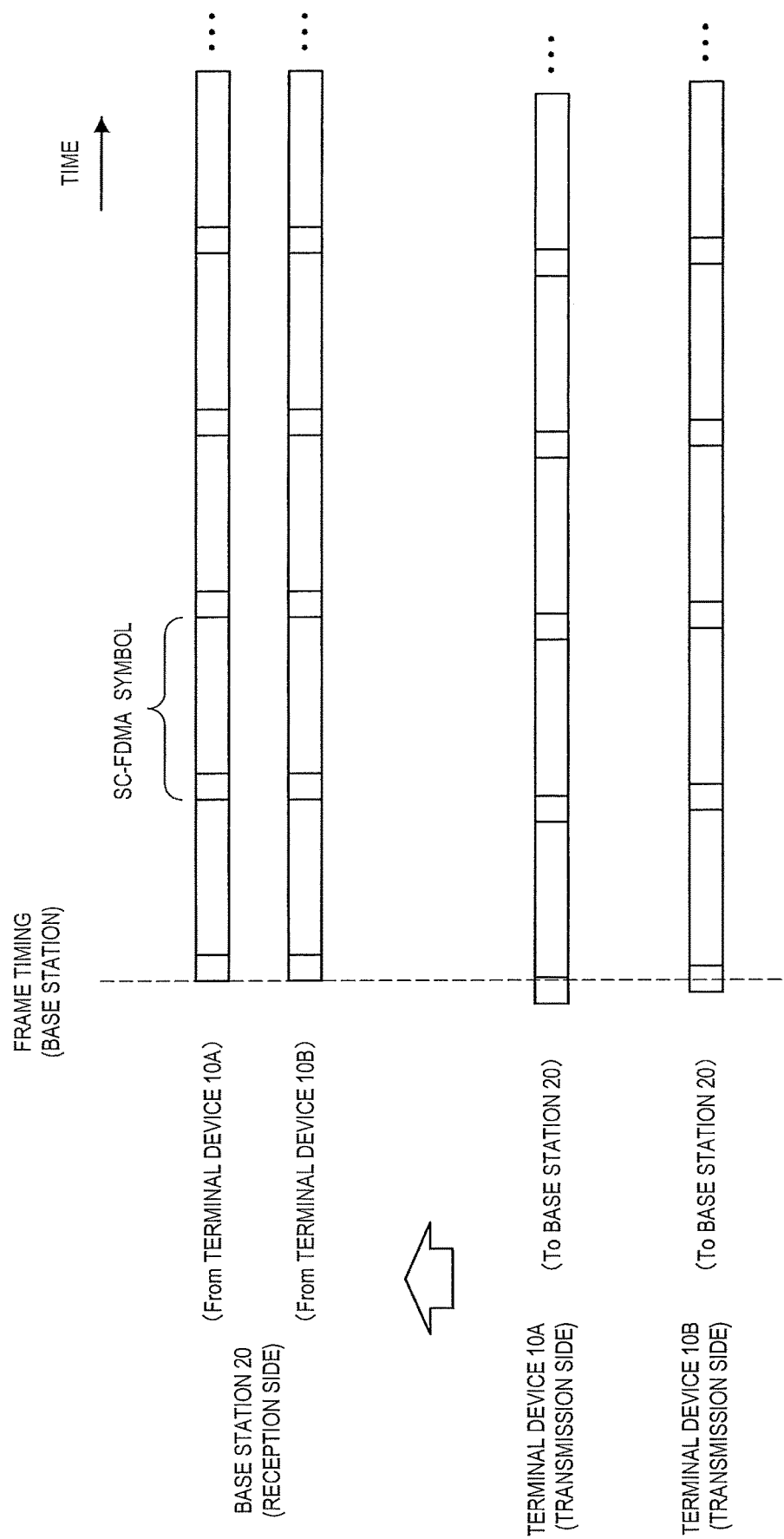
FIG. 5 is an explanatory diagram schematically illustrating an example of timings at which the terminal devices transmit uplink signals.

FIG. 5 is an explanatory diagram schematically illustrating an example of timings at which the terminal devices transmit the uplink signals. The timings at which the base station 20 receive the uplink signals from the terminal devices 10A and 10B with the subframes are illustrated in FIG. 5. Thus, the base station 20 receives the uplink signals simultaneously at a certain frame timing. The timings at which the terminal devices 10A and 10B transmit the uplink signals are also illustrated in FIG. 5. Thus, the terminal devices 10A and 10B start transmitting the uplink signals earlier than the frame timing.

Figure 6:
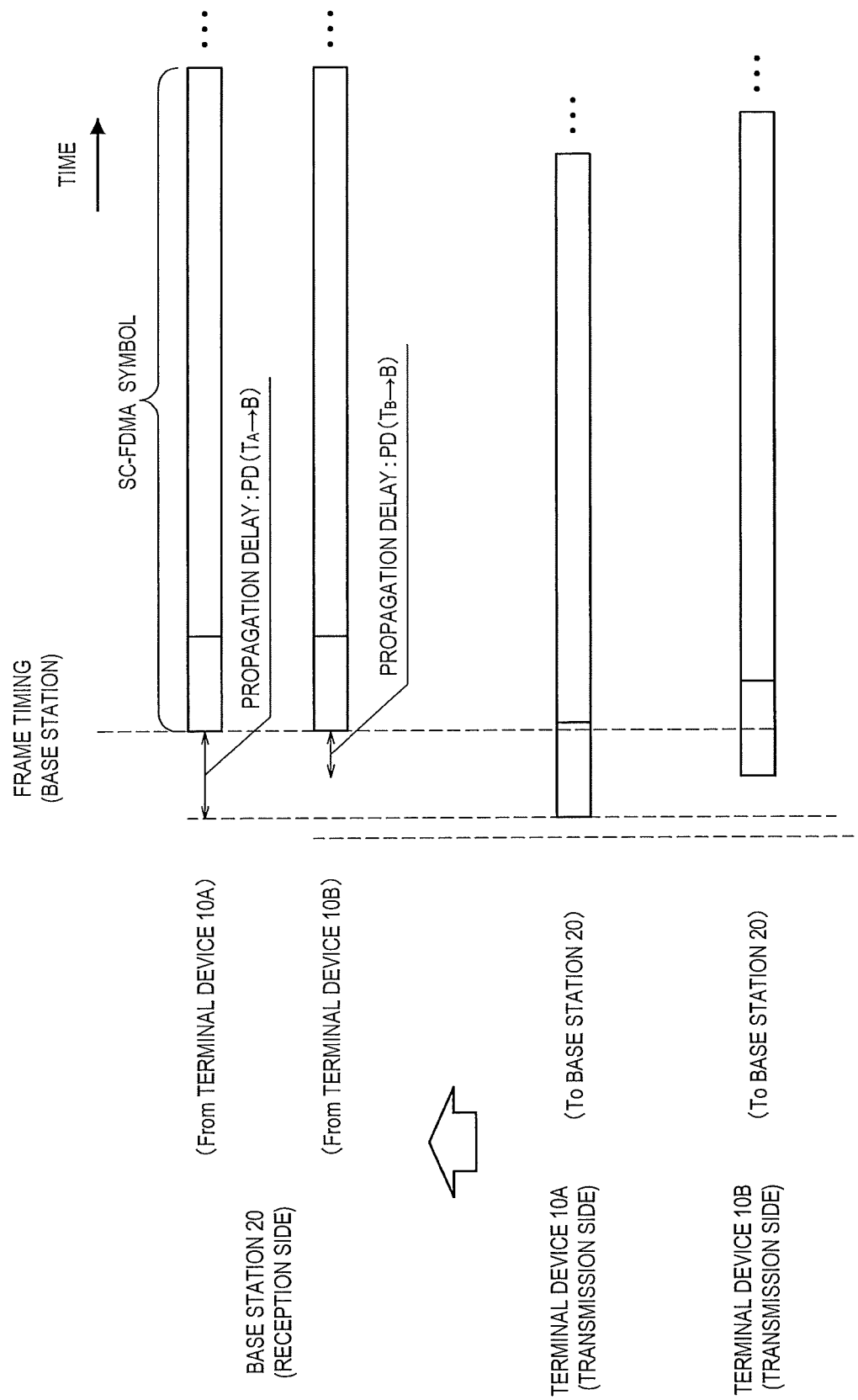
FIG. 6 is an explanatory diagram illustrating the details of an example of timings at which the terminal devices transmit the uplink signals.

FIG. 6 is an explanatory diagram illustrating the details of an example of timings at which the terminal devices transmit the uplink signals. The timings at which the terminal devices 10A and 10B illustrated in FIG. 5 receive the uplink signals are illustrated in more detail in FIG. 6. In this example, as illustrated in FIG. 1, the terminal device 10A is more distant from the base station 20 than the terminal device 10B. Therefore, propagation delay PD ($T_A$→B) in a path from the terminal device 10A to the base station 20 is greater than propagation delay PD ($T_B$→B) in a path from the terminal device 10B to the base station 20. That is, "PD ($T_A$→B)>PD ($T_B$→B)" is satisfied. Accordingly, a timing at which the terminal device 10A starts transmitting the uplink signal is earlier than a timing at which the terminal device 10B starts transmitting the uplink signal. Thus, the transmission timing of the uplink signal of the terminal device 10 is decided depending on where the terminal device 10 is located within the cell 21.

Thus, a technology for enabling the terminal devices 10 to transmit the uplink signals so that the uplink signals from the respective terminal devices 10 simultaneously reach the base station 20 is referred to as timing advance (TA). Hereinafter, the more detailed content of this point will be described with reference to FIG. 7.

Figure 7:
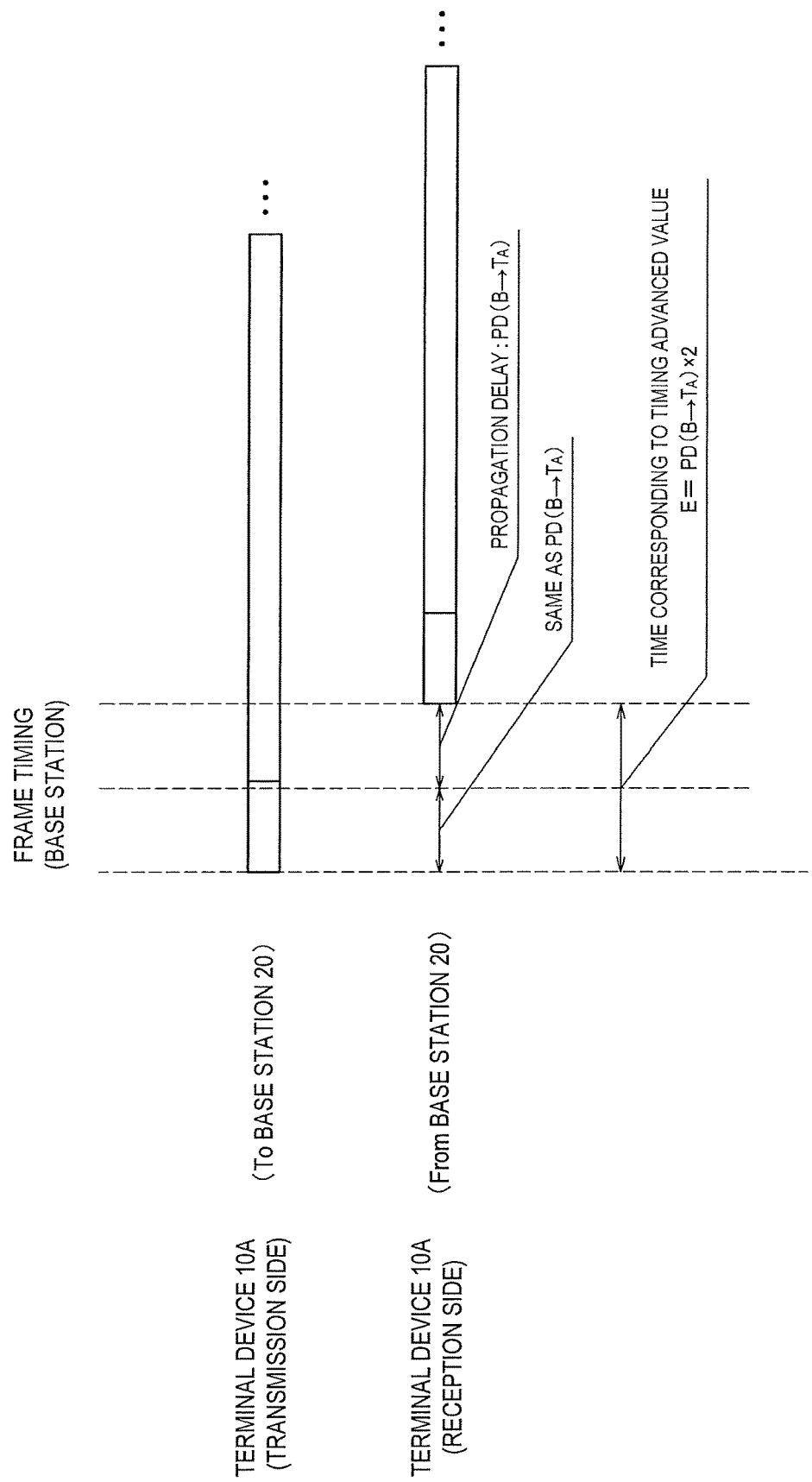
FIG. 7 is an explanatory diagram illustrating timing advance.

FIG. 7 is an explanatory diagram illustrating the timing advance. A transmission timing of the uplink signal of the terminal device 10A and a transmission timing of the downlink signal of the terminal device 10A are illustrated in FIG. 7. Thus, the transmission timing of the uplink signal is earlier than the frame timing by the same time as the propagation delay PD ($T_A$→B). The reception timing of the downlink signal is later than the frame timing by the propagation delay PD (B→$T_A$). In general, the propagation delay PD ($T_A$→B) is the same as the propagation delay PD (B→$T_A$). That is, "PD ($T_A$→B)=PD (B→$T_A$)" is satisfied. Accordingly, the terminal device 100A transmits the uplink signal earlier than a timing at which the downlink signal is to be received by a time twice the propagation delay PD (B→$T_A$) (or the propagation delay PD ($T_A$→B)).

The terminal device 10 knows the timing at which the downlink signal is to be received since the terminal device 10 receives the downlink signal. The terminal device 10 receives a timing advance value (TA value) as information used to decide a timing at which the uplink signal is transmitted from the base station. For example, the terminal device 10 is notified of an initial value of the TA value with a random access response at the time of random access. The terminal device 10 decides a timing earlier than the timing at which the downlink signal is transmitted by a time corresponding to the TA value as a timing at which the uplink signal is transmitted. That is, the time corresponding to the TA value corresponds to a time generally twice the propagation delay between the terminal device 10 and the base station. For example, a TA value corresponding to a longer time than the terminal device 10 located nearer the center of the cell is given to the terminal device 10 located in a cell edge of the cell 21. The TA value in LTE is an 11-bit value from 0 to 1282. A pitch width of the TA value for adjusting the transmission timing is about 0.52 microseconds. Accordingly, the transmission timing of the terminal device 10 can be adjusted up to 0.67 milliseconds.

<1.2. Technical Problem>

As described above, signals are transmitted and received in the cellular communication. On the other hand, it is not preferable to apply the transmission and reception timings of the signals in the cellular communication directly to the D2D communication between the terminal devices 10. Hereinafter, a specific example of this point will be described with reference to FIGS. 8 and 9. In this example, the OFDM is adopted in the D2D communication.

Figure 8:
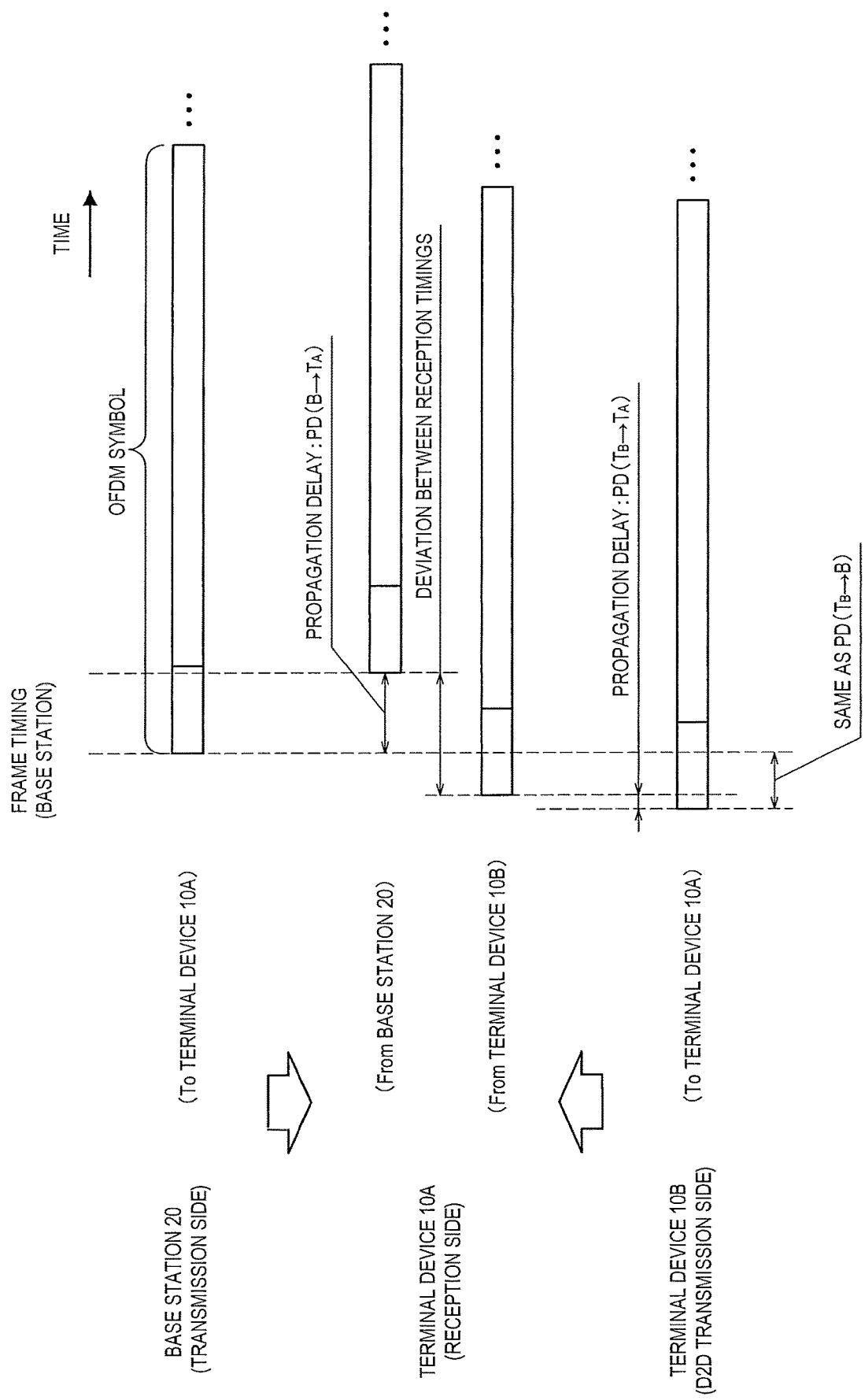
FIG. 8 is an explanatory diagram illustrating a first example when transmission and reception timings of signals in cellular communication are applied to D2D communication.

FIG. 8 is an explanatory diagram illustrating a first example when the transmission and reception timings of signals in the cellular communication are applied to the D2D communication. In the example of FIG. 8, the terminal device 10B is a transmission side device of the D2D communication and the terminal device 10A is a reception side device of the D2D communication. A transmission timing at which the base station 20 transmits a downlink signal and a reception timing at which the terminal device 10A receives the downlink signal are illustrated in FIG. 8. These timings have been described with reference to FIG. 4.

A transmission timing at which the terminal device 10B transmits a D2D communication signal through the D2D communication and a reception timing at which the terminal device 10A actually receives the D2D communication signal are also illustrated in FIG. 8. In this example, since the transmission and reception timings in the cellular communication are directly applied, the transmission timing at which the terminal device 10B transmits the D2D communication signal is the same as the transmission timing at which the terminal device 10B transmits the uplink signal. A reception timing at which the terminal device 10A actually receives the D2D communication signal is later than the transmission timing at which the terminal device 10B transmits the D2D communication signal by propagation delay PD ($T_A$→$T_B$). Since the distance between the terminal devices 10A and 10B is small at the time of the D2D communication, the propagation delay PD ($T_A$→$T_B$) becomes very small.

As a result, as illustrated in FIG. 8, a large deviation may occur between a reception timing at which the terminal device 10A receives the downlink signal and a reception timing at which the terminal device 10A actually receives the D2D communication signal. When the terminal device 10A demodulates a signal after the reception timing at which the terminal device 10A receives the downlink signal, a part of the D2D communication signal is not demodulated. The part includes not only the CP but also a signal other than the CP. Accordingly, the signal is not properly received.

Figure 9:
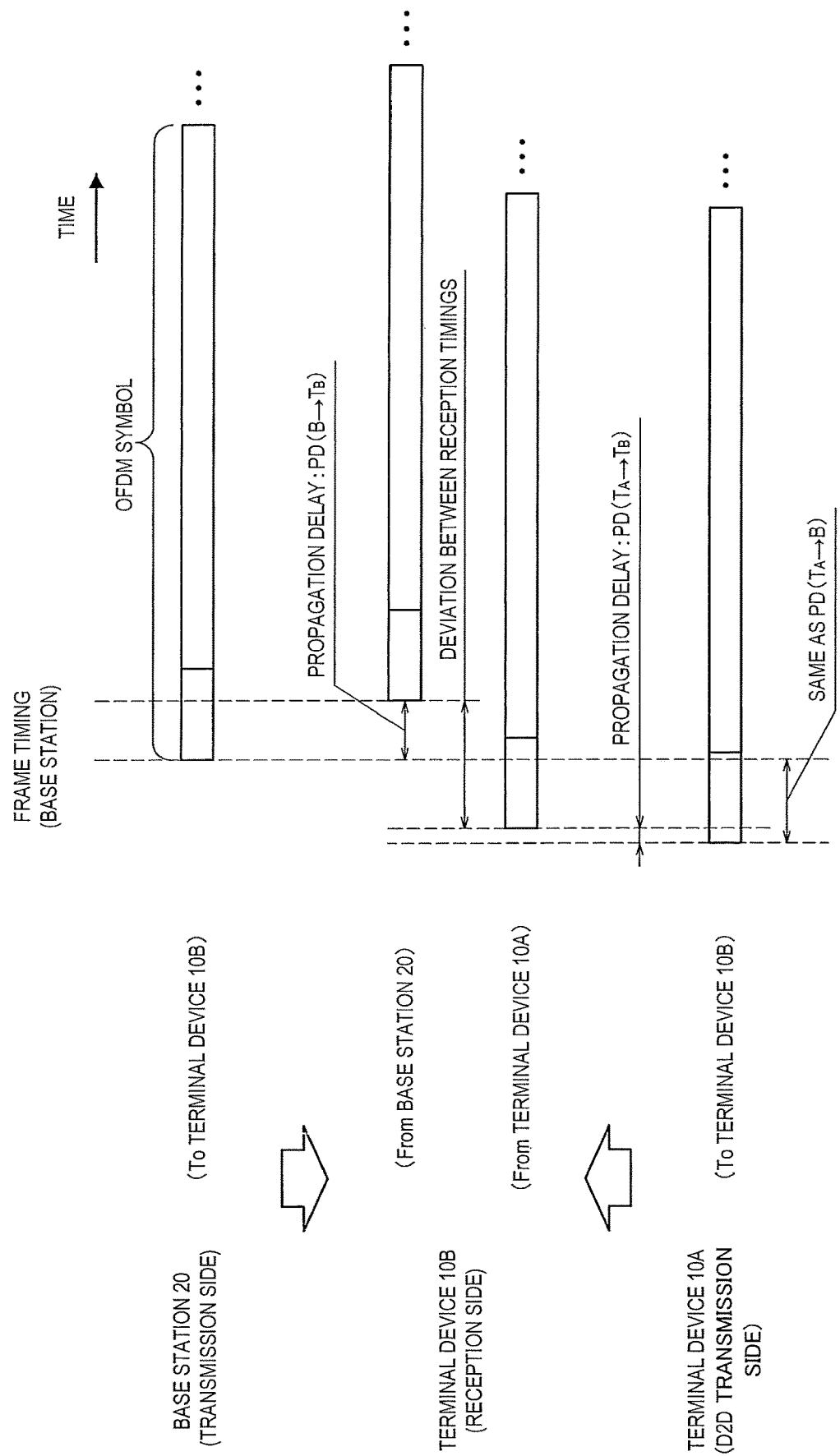
FIG. 9 is an explanatory diagram illustrating a second example when transmission and reception timings of signals in cellular communication are applied to D2D communication.

FIG. 9 is an explanatory diagram illustrating a second example when the transmission and reception timings of signals in the cellular communication are applied to the D2D communication. In the example of FIG. 9, the terminal device 10A is a transmission side device of the D2D communication and the terminal device 10B is a reception side device of the D2D communication. A transmission timing at which the base station 20 transmits a downlink signal and a reception timing at which the terminal device 10B receives the downlink signal are illustrated in FIG. 9. These timings have been described with reference to FIG. 4.

A transmission timing at which the terminal device 10A transmits a D2D communication signal in the D2D communication and a reception timing at which the terminal device 10B actually receives the D2D communication signal are also illustrated in FIG. 9. In this example, since the transmission and reception timings in the cellular communication are directly applied, the transmission timing at which the terminal device 10A transmits the D2D communication signal is the same as the transmission timing at which the terminal device 10A transmits the uplink signal. A reception timing at which the terminal device 10B actually receives the D2D communication signal is later than the transmission timing at which the terminal device 10A transmits the D2D communication signal by propagation delay PD ($T_B$→$T_A$). Since the distance between the terminal devices 10A and 10B is not distant at the time of the D2D communication, the propagation delay PD ($T_B$→$T_A$) becomes very small.

As a result, as illustrated in FIG. 9, a large deviation may occur between a reception timing at which the terminal device 10B receives the downlink signal and a reception timing at which the terminal device 10B actually receives the D2D communication signal. When the terminal device 10A demodulates signals after the reception timing at which the terminal device 10B receives the downlink signal, some of the D2D communication signals are not demodulated. Some of the signals include not only the CP but also a signal other than the CP. Accordingly, the signal is not properly received.

As described above with reference to FIGS. 8 and 9, when an adjustment width (that is, a time corresponding to the TA value) of an uplink transmission timing by the TA is large, a portion other than the CP of the D2D communication signal is not demodulated and the D2D communication signal is not properly received. Since the D2D communication is assumed to be frequency used mainly in a cell edge distant from the base station 20, the TA value in regard to the terminal device 10 performing the D2D communication is assumed to be a relatively large value. Accordingly, there is a possibility of the D2D communication signal not being properly demodulated.

The above-mentioned problem will be described using more detailed numerical values. For example, the terminal devices 10A and 10B are assumed to be present in a cell edge of a cell with a radius of 1 kilometer. In this case, propagation delay in a path from the base station 20 to the terminal device 10 is about 3.33 microseconds. Accordingly, when the distance between the terminal devices 10 is neglected, deviation of a reception timing between the terminal devices 10 is about 6.66 microseconds. On the other hand, the length of the CP is 4.687 microseconds. Accordingly, when the deviation of the reception timing exceeds the length of the CP, the D2D communication signals are not properly received.

In the above-described example, the distance between the terminal device 10 and the base station 20 is 1 kilometer. However, when this distance is shorter, the D2D communication signals can be properly received. For example, when the distance between the terminal device 10 and the base station 20 is 700 meters, the propagation delay is 2.33 microseconds. In this case, the deviation of the reception timing is about 4.66 microseconds. Accordingly, the propagation delay permitted in the D2D communication is 0.021 microseconds in consideration of the fact that the cyclic prefix has a length of 4.687 microseconds. This propagation delay corresponds to a distance of 6.3 meters. However, under the constraint of the propagation delay or the distance, a large influence on the D2D communication can occur due to, for example, a slight change in the propagation delay caused by movement of the terminal device 10 or a change in a propagation path. Accordingly, reliable communication is considered not to be ensured.

Thus, when the transmission and reception timings optimized for the communication with the base station 20 are used in the terminal device 10, whether the D2D communication is possible depends on the distance between the terminal device 10 and the base station 20 and the distance between the terminal devices 10 performing the D2D communication. That is, large constraint may be imposed on the D2D communication.

Accordingly, in the embodiment, a possibility of signals being properly received in the D2D communication in which the same communication scheme as the communication scheme of the cellular communication is adopted can be configured to be improved. More specifically, it is possible to loosen or remove the constraints in the D2D communication, such as the distance between the base station 20 and the terminal devices 10 performing the D2D communication, the distance between the terminal devices 10 performing the D2D communication, and the like.

2. SCHEMATIC CONFIGURATION OF RADIO COMMUNICATION SYSTEM

Figure 10:
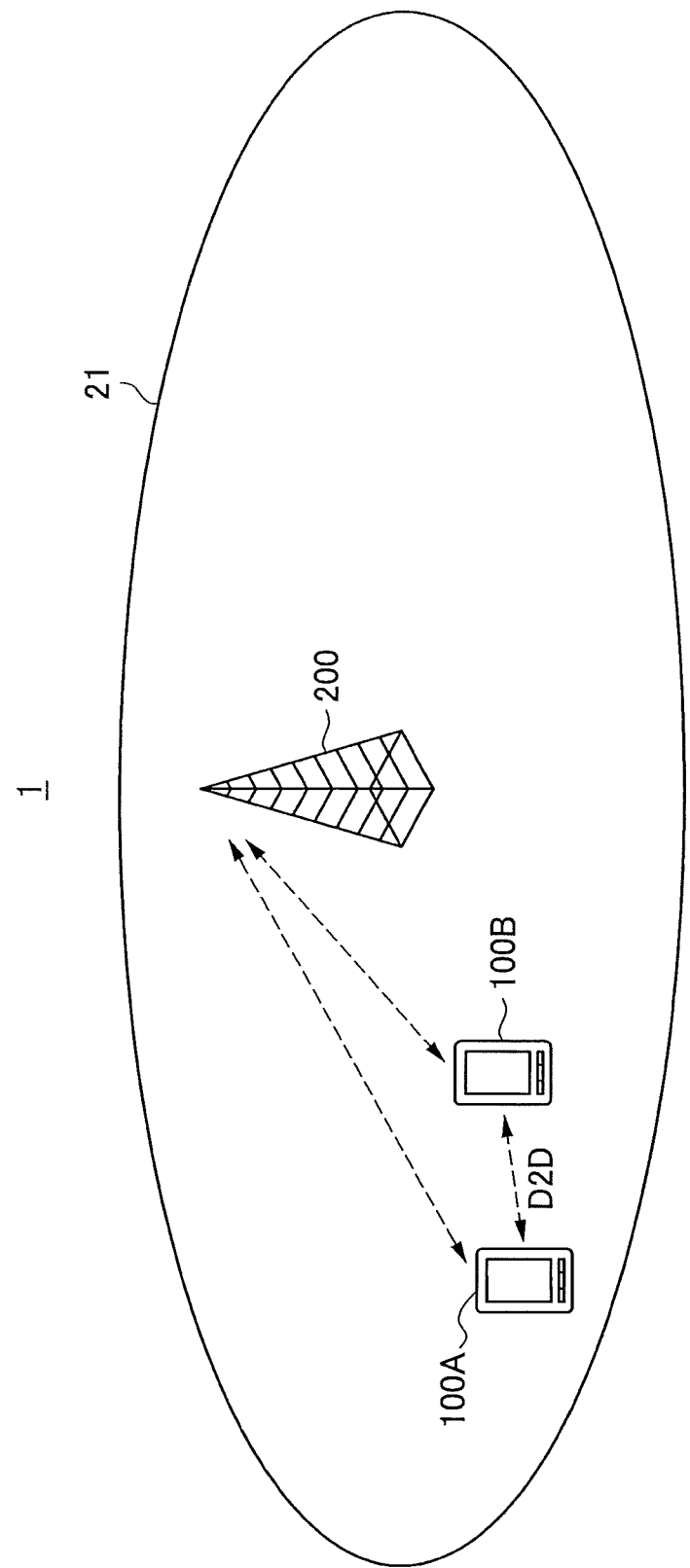
FIG. 10 is an explanatory diagram illustrating an example of a schematic configuration of a radio communication system according to an embodiment.

Next, a schematic configuration of the radio communication system 1 according to an embodiment of the present disclosure will be described with reference to FIG. 10. FIG. 10 is an explanatory diagram illustrating an example of the schematic configuration of the radio communication system 1 according to the embodiment. Referring to FIG. 10, the radio communication system 1 includes terminal devices 100 and a base station 200. The radio communication system 1 adopts, for example, LTE as a communication scheme of the cellular communication.

The terminal device 100 performs radio communication with the base station 200 when the terminal device 100 is located within a cell 21 formed by the base station 200. That is, the terminal device 100 receives a downlink signal transmitted by the base station 200 and transmits an uplink signal to the base station 200. For example, the terminal device 100 receives the downlink signal according to the OFDM and transmits an uplink signal according to the SC-FDMA.

The terminal device 100 performs D2D communication with another terminal device 100. For example, the terminal device 100 transmits a signal through the D2D communication according to a predetermined radio communication scheme and receives a signal according to the predetermined radio communication scheme. The predetermined radio communication scheme is, for example, a radio communication scheme used by the base station 200 to transmit a downlink signal. That is, the predetermined radio communication scheme is the OFDM. That is, the terminal device 100 transmits and receives signals according to the OFDM through the D2D communication.

The base station 200 performs the radio communication with the terminal device 100 located within the cell 21. That is, the base station 200 transmits a downlink signal to the terminal device 100 and receives an uplink signal from the terminal device 100. For example, the base station 200 transmits a downlink signal according to the OFDM and receives an uplink signal according to the SC-FDMA.

3. CONFIGURATION OF TERMINAL DEVICE

Figure 11:
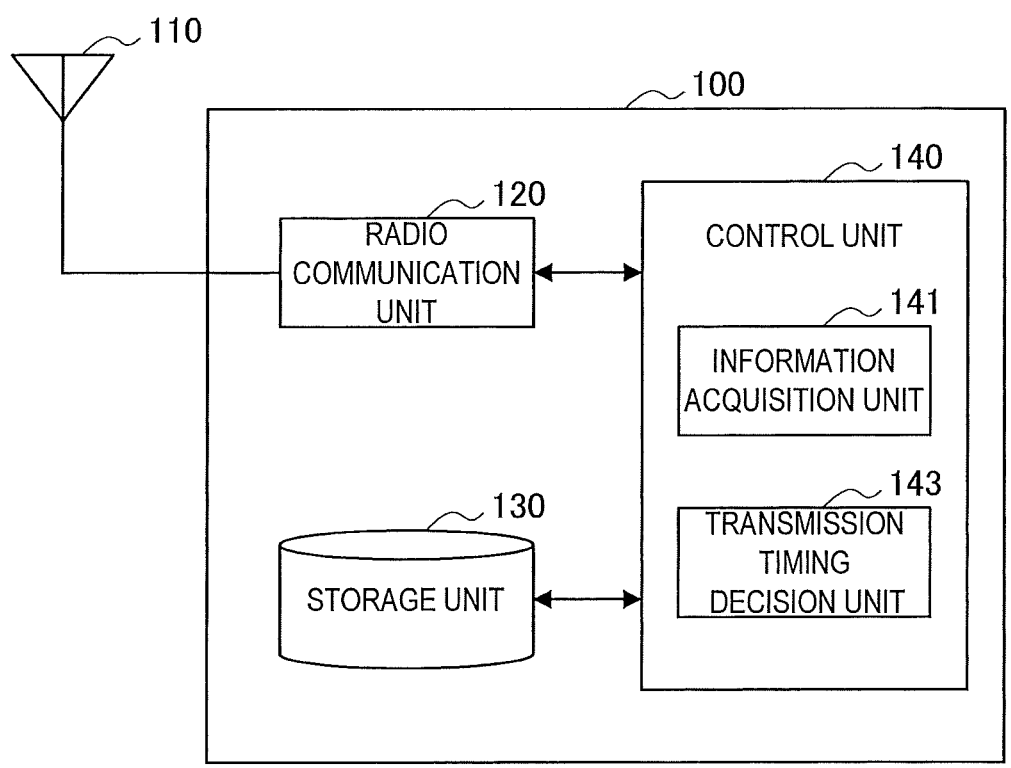
FIG. 11 is a block diagram illustrating an example of the configuration of a terminal device according to an embodiment.

An example of the configuration of the terminal device 100 according to the embodiment will be described with reference to FIGS. 11 to 19. FIG. 11 is a block diagram illustrating an example of the configuration of the terminal device 100 according to the embodiment. Referring to FIG. 11, the terminal device 100 includes an antenna unit 110, a radio communication unit 120, a storage unit 130, and a control unit 140.

(Antenna Unit 110)

The antenna unit 110 receives the radio signal and outputs the received radio signal to the radio communication unit 120. The antenna unit 110 transmits a transmission signal output by the radio communication unit 120.

(Radio Communication Unit 120)

The radio communication unit 120 performs the radio communication with another device. For example, when the terminal device 100 is located within the cell 21 formed by the base station 200, the radio communication unit 120 performs the radio communication with the base station 200. That is, the radio communication unit 120 receives the downlink signal transmitted by the base station 200 and transmits the uplink signal to the base station 200. For example, the radio communication unit 120 receives the downlink signal according to the OFDM and transmits the uplink signal according to the SC-FDMA.

In particular, in the embodiment, the radio communication unit 120 performs the D2D communication with another terminal device 100. For example, the radio communication unit 120 transmits a signal according to a predetermined radio communication scheme through the D2D communication and receives a signal according to the predetermined radio communication scheme. The predetermined radio communication scheme is, for example, a radio communication scheme used by the base station 200 to transmit the downlink signal. That is, the predetermined radio communication scheme is the OFDM. The radio communication unit 120 transmits and receives the signals according to the OFDM through the D2D communication.

(Storage Unit 130)

The storage unit 130 stores a program and data for an operation of the terminal device 100.

(Control Unit 140)

The control unit 140 supplies various functions of the terminal device 100. The control unit 140 includes an information acquisition unit 141 and a transmission timing decision unit 143.

(Information Acquisition Unit 141)

The information acquisition unit 141 acquires a reception timing (hereinafter referred to as a "downlink reception timing") at which the terminal device 100 (the radio communication unit 120) receives the downlink signal from the base station 200 performs radio communication with the terminal device 100 or the other terminal device 100. For example, the terminal device 100 and the other terminal device 100 are located within the same cell 21 and the base station 200 is a base station of the cell 21. That is, the terminal device 100 and the other terminal device 100 receive downlink signals from the same base station 200. Then, the information acquisition unit 141 acquires the downlink reception timing at which the terminal device 100 (the radio communication unit 120) receives the downlink signal from the base station 200. For example, the information acquisition unit 141 acquires the downlink reception timing from a detection result of the downlink signal by the radio communication unit 120.

For example, the information acquisition unit 141 further acquires timing advance information (TA information) to decide a timing (hereafter referred to as an uplink transmission timing) at which the terminal device 100 (the radio communication unit 120) transmits the uplink signal. The TA information is, for example, a TA value. As described above, since the terminal device 100 is notified of the TA value with a random access response at the time of random access, the information acquisition unit 141 acquires the TA value notified of with the random access response via the radio communication unit 120.

The information acquisition unit 141 may further acquire the TA information to decide a timing (that is, an uplink transmission timing of the other terminal device 100) at which the other terminal device 100 transmits the uplink signal. In this case, for example, the base station 200 may acquire the TA value of the other terminal device 100 and transmit the TA value to the terminal device 100. When the radio communication unit 120 receives the TA value of the other terminal device 100, the information acquisition unit 141 may acquire the TA value of the other terminal device 100.

(Transmission Timing Decision Unit 143)

The transmission timing decision unit 143 decides the transmission timing at which the terminal device 100 transmits a signal.

For example, the transmission timing decision unit 143 decides a transmission timing (hereinafter referred to as an "uplink transmission timing") at which the terminal device 100 (the radio communication unit 120) transmits the uplink signal to the base station 200. More specifically, for example, the transmission timing decision unit 143 decides a timing earlier than the downlink reception timing by a time corresponding to the acquired TA value as the uplink transmission timing. Then, the transmission timing decision unit 143 causes the radio communication unit 120 to transmit the uplink signal at the decided uplink transmission timing.

In particular, in the embodiment, the transmission timing decision unit 143 decides a transmission timing (hereinafter referred to as a "D2D transmission timing") at which the terminal device 100 (the radio communication unit 120) transmits a signal to the other terminal device 100 through the D2D communication based on the acquired downlink reception timing. The decided D2D transmission timing is a timing later than a timing (that is, the uplink transmission timing) at which the terminal device 100 (the radio communication unit 120) transmits the uplink signal.

As described above, when the D2D transmission timing of a transmission side device of the D2D communication is the same as the uplink transmission timing, the D2D communication signal may arrive at a reception side device quite earlier than the downlink reception timing of the reception side device of the D2D communication. For this reason, there is a possibility of a portion other than the CP in the D2D communication signal not being demodulated according to distances between the base station 200, and the reception side device and the transmission side device and the distance between the reception side device and the transmission side device.

On the other hand, in the embodiment, when the D2D transmission timing is a timing later than the uplink transmission timing, the downlink reception timing and the D2D reception timing of a partner side are closer. Accordingly, there is a high possibility of the D2D communication signal being properly received. In other words, it is possible to loosen constraints (for example, the distances between the base station 200, and the reception side device and the transmission side device and the distance between the reception side device and the transmission side device) for proper reception of the D2D communication signal. As a result, off-loading can be performed more effectively, which considerably contributes to an increase a system capacity.

Hereinafter, a more specific example of the decided D2D transmission timing will be described.

First Example of D2D Transmission Timing

As a first example, the transmission timing decision unit 143 decides the D2D transmission timing based on the downlink reception timing of the terminal device 100 and the TA information of the terminal device 100. As described above, the TA information is, for example, a TA value. Since the TA information (for example, a TA value) is an existing parameter of which the terminal device 100 is notified at the time of the random access, it is not necessary for the base station 200 to transmit a new control signal.

For example, the decided D2D transmission timing is a timing earlier than the downlink reception timing. For example, the transmission timing decision unit 143 multiples a time corresponding to the TA value of the terminal device 100 by a coefficient P (where 0<P<1). Then, the transmission timing decision unit 143 decides the timing earlier than the downlink reception timing by a time of the multiplication result as the D2D transmission timing. Then, the transmission timing decision unit 143 causes the radio communication unit 120 to transmit the D2D communication signal at the decided D2D transmission timing.

In this way, it is possible to prevent a period in which the partner device actually receives the D2D communication signal from not entering a period in which the partner device receives the downlink signal because the D2D transmission timing is too late.

For example, the decided D2D transmission timing is a timing later than a timing (hereinafter referred to as a "downlink transmission timing") at which the base station 200 transmits the downlink signal. For example, the downlink transmission timing is a timing earlier than the downlink reception timing by half of the time corresponding to the TA information of the terminal device 100.

Specifically, for example, the transmission timing decision unit 143 multiples a time corresponding to the TA value of the terminal device 100 by the coefficient P (where 0<P≤½). Then, the transmission timing decision unit 143 decides a timing earlier than the downlink reception timing by a time of the multiplication result as the D2D transmission timing.

In this way, the D2D transmission timing is later than the downlink transmission timing of the base station. Since the downlink reception timing of the partner device is at least later than the downlink transmission timing, the downlink reception timing and the D2D transmission timing are closer. Accordingly, there is a high possibility of the D2D communication signal being properly received. In other words, it is possible to loosen constraints (for example, the distances between the base station 200, and the reception side device and the transmission side device and the distance between the reception side device and the transmission side device) for proper reception of the D2D communication signal.

As a specific example, the decided D2D transmission timing is a timing (that is, the downlink transmission timing) at which the base station 200 transmits the downlink signal. As described above, for example, the downlink transmission timing is a timing earlier than the downlink reception timing by half of the time corresponding to the TA information of the terminal device 100. For example, the transmission timing decision unit 143 multiples the time corresponding to the TA value of the terminal device 100 by a coefficient ½. Then, the transmission timing decision unit 143 decides the timing earlier than the downlink reception timing by the time of the multiplication result as the D2D transmission timing.

In this way, the D2D transmission timing becomes nearly constant between the terminal devices 100. That is, a variation in the D2D transmission timing by the terminal device 100 is small irrespective of the position of each terminal device 100 within the cell 21, a frequency band used for the D2D communication, and a duplex communication scheme (for example, an FDD scheme or a TDD scheme).

Hereinafter, a specific example will be described with reference to FIGS. 12 and 13.

Figure 12:
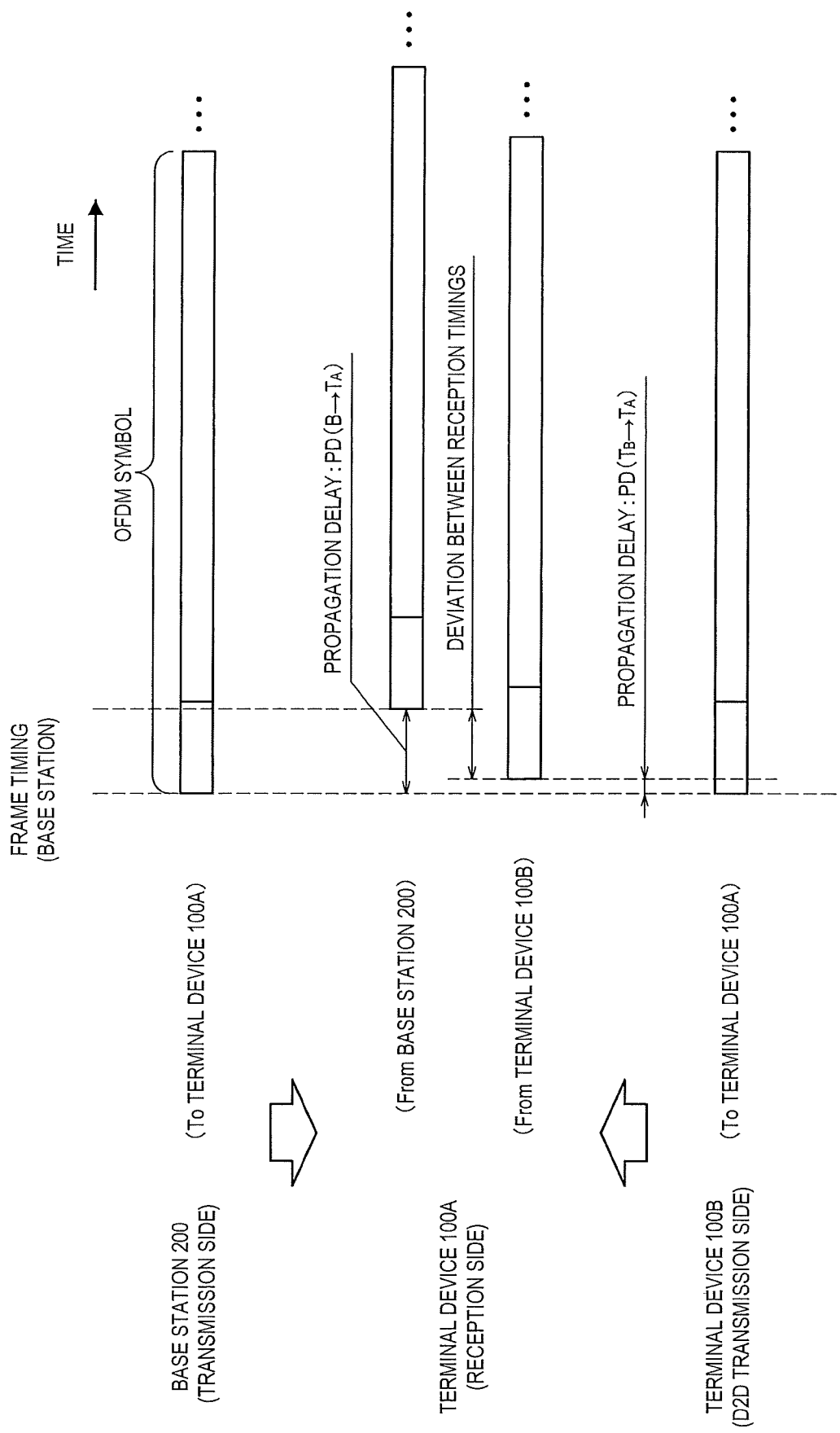
FIG. 12 is a first explanatory diagram illustrating a first example of a D2D transmission timing according to an embodiment.

FIG. 12 is a first explanatory diagram illustrating a first example of a D2D transmission timing according to the embodiment. In the example of FIG. 12, the terminal device 100B is a transmission side device of the D2D communication and the terminal device 100A is a reception side device of the D2D communication. A downlink transmission timing at which the base station 200 transmits a downlink signal and a downlink reception timing at which the terminal device 100A receives the downlink signal are illustrated in FIG. 12. This point is the same as that of the example illustrated in FIG. 8.

A D2D transmission timing at which the terminal device 100B transmits a D2D communication signal in the D2D communication and a D2D reception timing at which the terminal device 100A actually receives the D2D communication signal are also illustrated in FIG. 12. In this example, the D2D transmission timing of the terminal device 100B is almost the same as the downlink transmission timing of the base station 200. As a result, a deviation between the reception timings (that is, a deviation between the D2D reception timing and the downlink reception timing in the terminal device 100A) illustrated in FIG. 12 is less than the deviation between the reception timings illustrated in FIG. 8. As a result, the deviation between the reception timings is less than the length of the CP and the terminal device 100A can properly receive the D2D communication signal.

Figure 13:
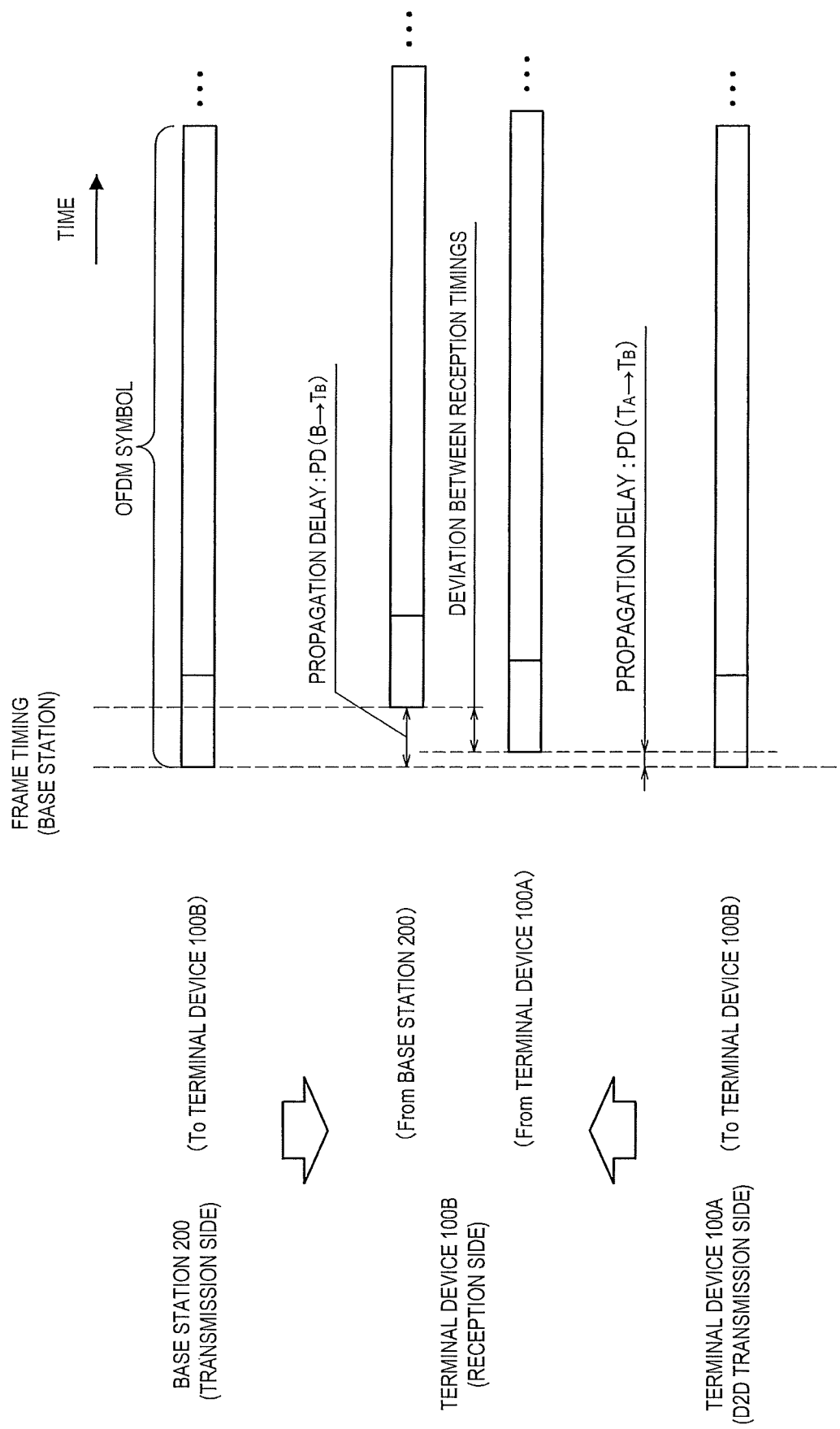
FIG. 13 is a second explanatory diagram illustrating a first example of a D2D transmission timing according to an embodiment.

FIG. 13 is a second explanatory diagram illustrating the first example of the D2D transmission timing according to the embodiment. In the example of FIG. 13, the terminal device 100A is a transmission side device of the D2D communication and the terminal device 100B is a reception side device of the D2D communication. A downlink transmission timing at which the base station 200 transmits a downlink signal and a downlink reception timing at which the terminal device 100B receives the downlink signal are illustrated in FIG. 13. This point is the same as that of the example illustrated in FIG. 9.

A D2D transmission timing at which the terminal device 100A transmits a D2D communication signal in the D2D communication and a D2D reception timing at which the terminal device 100B actually receives the D2D communication signal are also illustrated in FIG. 13. In this example, the D2D transmission timing of the terminal device 100A is almost the same as the downlink transmission timing of the base station 200. As a result, a deviation between the reception timings (that is, a deviation between the D2D reception timing and the downlink reception timing in the terminal device 100B) illustrated in FIG. 12 is less than the deviation between the reception timings illustrated in FIG. 9. As a result, the deviation between the reception timings is less than the length of the CP and the terminal device 100B can properly receive the D2D communication signal.

Second Example of D2D Transmission Timing

As a second example, a decided D2D transmission timing is a reception timing (that is, a downlink reception timing) at which the terminal device 100 receives the downlink signal. That is, the transmission timing decision unit 143 decides the acquired downlink reception timing as the D2D transmission timing. Then, the transmission timing decision unit 143 causes the radio communication unit 120 to transmit the D2D communication signal at the decided D2D transmission timing.

In general, the terminal devices 100 (for example, the terminals 100A and 100B) performing the D2D communication are located nearby. That is, the distance between the terminal devices 100 is small. Therefore, a difference between the downlink reception timing of the transmission side device and the downlink reception timing of the reception side in the D2D communication is small. Further, in the D2D communication, propagation delay from the transmission side device to the reception side device is small. Accordingly, when the transmission side device (for example, the terminal device 100A) of the D2D communication transmits a D2D communication signal at a downlink reception timing of the own device, the reception side device (for example, the terminal device 100B) can receive the D2D communication signal at a timing close to the downlink reception timing of the own device. Accordingly, there is a high possibility of the D2D communication signal being properly received. In other words, it is possible to loosen constraints (for example, the distances between the base station 200, and the reception side device and the transmission side device and the distance between the reception side device and the transmission side device) for proper reception of the D2D communication signal.

In this case, information other than the reception timing is not necessary. Accordingly, even when the TA value is not yet acquired (for example, the terminal device 100 does not perform random access and is in an idle state), the terminal device 100 can transmit the D2D communication signal at a proper D2D transmission timing.

Hereinafter, a specific example will be described with reference to FIGS. 14 and 15.

Figure 14:
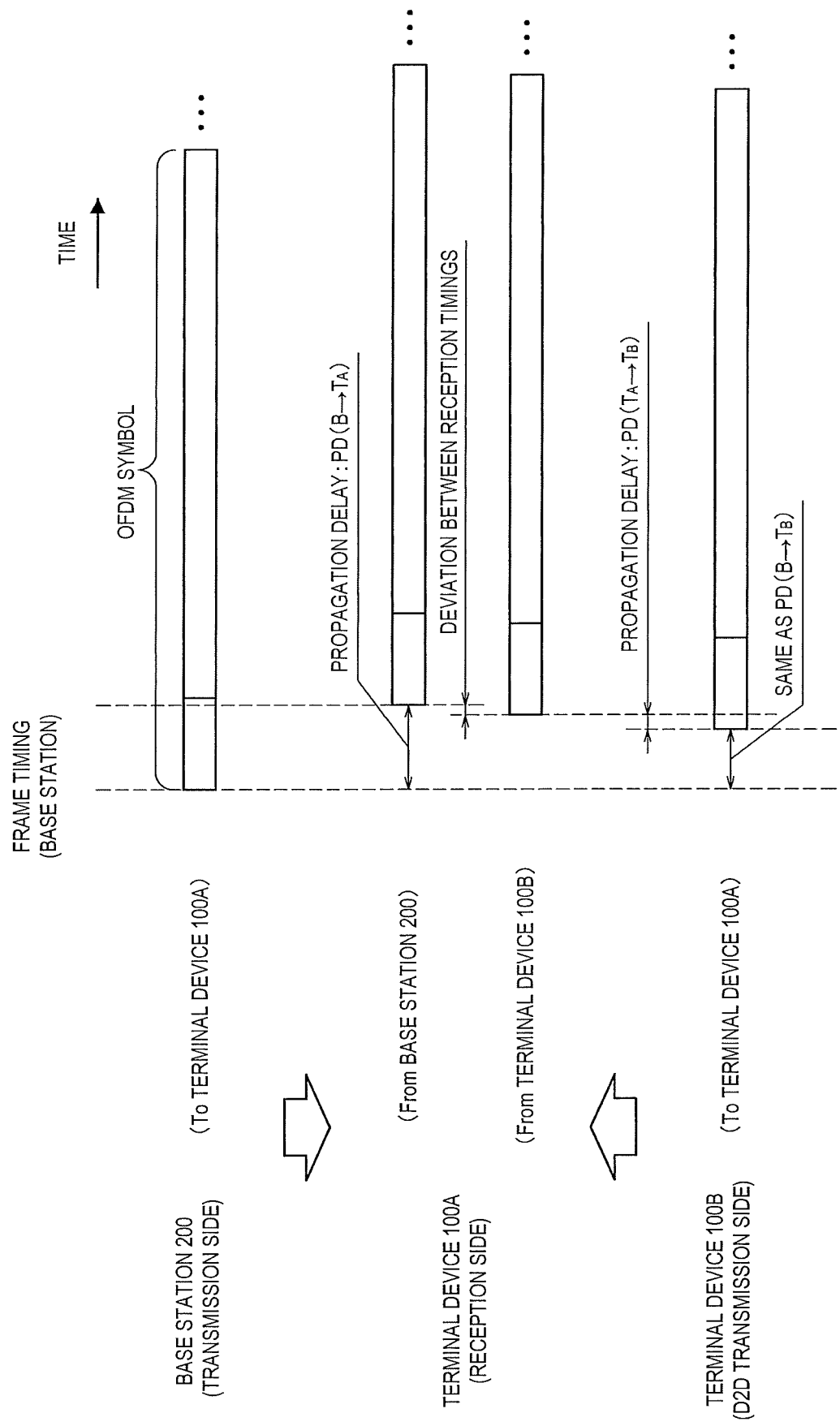
FIG. 14 is a first explanatory diagram illustrating a second example of a D2D transmission timing according to an embodiment.

FIG. 14 is a first explanatory diagram illustrating a second example of the D2D transmission timing according to the embodiment. In the example of FIG. 14, the terminal device 100B is a transmission side device of the D2D communication and the terminal device 100A is a reception side device of the D2D communication. A downlink transmission timing at which the base station 200 transmits a downlink signal and a downlink reception timing at which the terminal device 100A receives the downlink signal are illustrated in FIG. 14. This point is the same as those of the examples illustrated in FIGS. 8 and 12.

A D2D transmission timing at which the terminal device 100B transmits a D2D communication signal in the D2D communication and a D2D reception timing at which the terminal device 100A actually receives the D2D communication signal are also illustrated in FIG. 14. In this example, the D2D transmission timing of the terminal device 100B is the same as the downlink reception timing of the terminal device 100B. As a result, a deviation between the reception timings (that is, a deviation between the D2D reception timing and the downlink reception timing in the terminal device 100A) illustrated in FIG. 14 is less than the deviation between the reception timings illustrated in FIG. 8. As a result, the deviation between the reception timings is less than the length of the CP and the terminal device 100A can properly receive the D2D communication signal.

Figure 15:
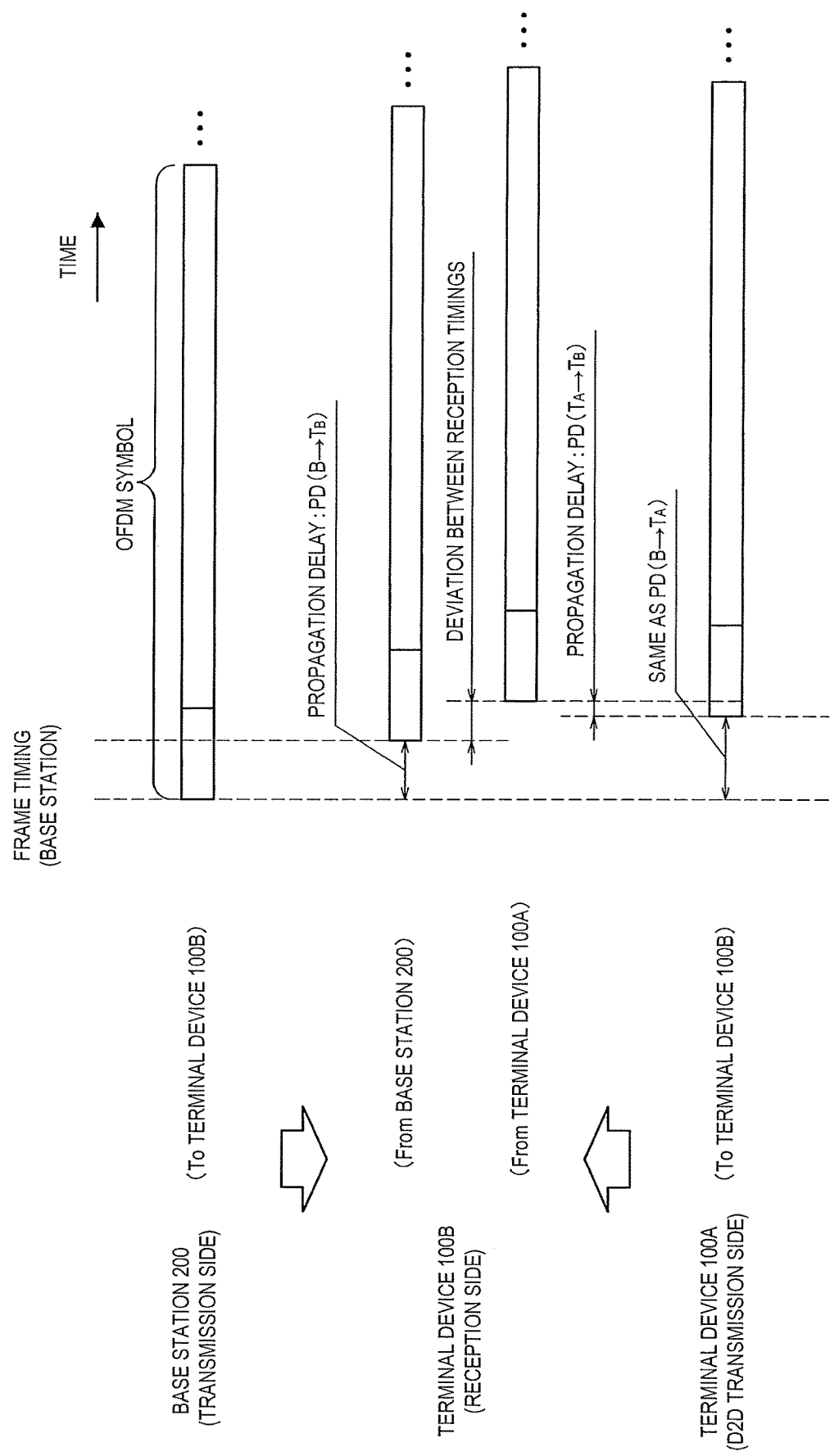
FIG. 15 is a second explanatory diagram illustrating a second example of a D2D transmission timing according to an embodiment.

FIG. 15 is a second explanatory diagram illustrating the second example of the D2D transmission timing according to the embodiment. In the example of FIG. 15, the terminal device 100A is a transmission side device of the D2D communication and the terminal device 100B is a reception side device of the D2D communication. A downlink transmission timing at which the base station 200 transmits a downlink signal and a downlink reception timing at which the terminal device 100B receives the downlink signal are illustrated in FIG. 15. This point is the same as that of the example illustrated in FIG. 9.

A D2D transmission timing at which the terminal device 100A transmits a D2D communication signal in the D2D communication and a D2D reception timing at which the terminal device 100B actually receives the D2D communication signal are also illustrated in FIG. 15. In this example, the D2D transmission timing of the terminal device 100A is the same as the downlink reception timing of the terminal device 100A. As a result, a deviation between the reception timings (that is, a deviation between the D2D reception timing and the downlink reception timing in the terminal device 100B) illustrated in FIG. 15 is less than the deviation between the reception timings illustrated in FIG. 9. In this example, the D2D reception timing is slightly later than the downlink reception timing. Accordingly, when a reception period of the downlink signal is set to be slightly longer than the length of the OFDM symbol, the terminal device 100B can properly receive the D2D communication signal.

The above-described D2D transmission timing may be applied to a case in which a predetermined condition is satisfied. For example, when a time advance group (TAG) of the transmission side device (for example, the terminal device 100A) is the same as a TAG of the reception side device (for example, the terminal device 100B), the above-described D2D transmission timing may be applied.

The fact that the TAG of the transmission side device is the same as the TAG of the reception side device means that the TA value of the transmission side device is the same as the TA value of the reception side device. Accordingly, when the TAG of the transmission side device is the same as the TAG of the reception side device, the downlink reception timing of the transmission side device is the same as the downlink reception timing of the reception side device. Accordingly, the downlink reception timing and the D2D reception timing in the reception side device can be closer.

When the TAGs of two terminal devices performing the D2D communication are not the same, the D2D transmission timings may be individually adjusted by an offset value of the transmission timing.

Such determination of whether the TAGs are the same and adjustment of the transmission timings by the offset value are performed by the base station 200. Then, for example, the base station 200 notifies the terminal device 100 performing the D2D communication.

Third Example of D2D Transmission Timing

As a third example, the transmission timing decision unit 143 decides the D2D transmission timing based on the downlink reception timing of the terminal device 100, the TA information of the terminal device 100, and the TA information of another terminal device 100.

For example, the decided D2D transmission timing is a timing (that is, a downlink reception timing of the other terminal device 100) at which the other terminal device 100 (that is, a reception side terminal device of the D2D communication) receives a downlink signal from the base station 200. For example, the downlink reception timing of the other terminal device 100 is a timing later than a timing (that is, a downlink transmission timing) at which the base station 200 transmits the downlink signal by half of a time corresponding to the TA information of the other terminal device 100.

Specifically, for example, the transmission timing decision unit 143 multiples the time corresponding to the TA value of the terminal device 100 by a coefficient ½. Then, the transmission timing decision unit 143 calculates a timing earlier than the downlink transmission timing by a time of a multiplication result as the downlink transmission timing of the base station 200. The transmission timing decision unit 143 calculates a timing later than the calculated downlink transmission timing by half of a time corresponding to the TA information of the other terminal device 100 as the downlink reception timing of the other terminal device 100. The half time corresponds to propagation delay from the base station 200 to the other terminal device 100. The transmission timing decision unit 143 decides the downlink reception timing of the other terminal device 100 as a D2D transmission timing of the terminal device 100. The transmission timing decision unit 143 causes the radio communication unit 120 to transmit the D2D communication signal at the decided D2D transmission timing.

In general, the terminal devices 100 (for example, the terminals 100A and 100B) performing the D2D communication are located nearby. That is, the distance between the terminal devices 100 is small. Therefore, in the D2D communication, propagation delay from the transmission side device to the reception side device is small. Accordingly, when the transmission side device (for example, the terminal device 100A) of the D2D communication transmits a D2D communication signal at a downlink reception timing of the reception side device (for example, the terminal device 100B), the reception side device can receive the D2D communication signal at a timing close to the downlink reception timing of the own device. Accordingly, there is a high possibility of the D2D communication signal being properly received. In other words, it is possible to loosen constraints (for example, the distances between the base station 200, and the reception side device and the transmission side device and the distance between the reception side device and the transmission side device) for proper reception of the D2D communication signal.

Hereinafter, a specific example will be described with reference to FIGS. 16 and 17.

Figure 16:
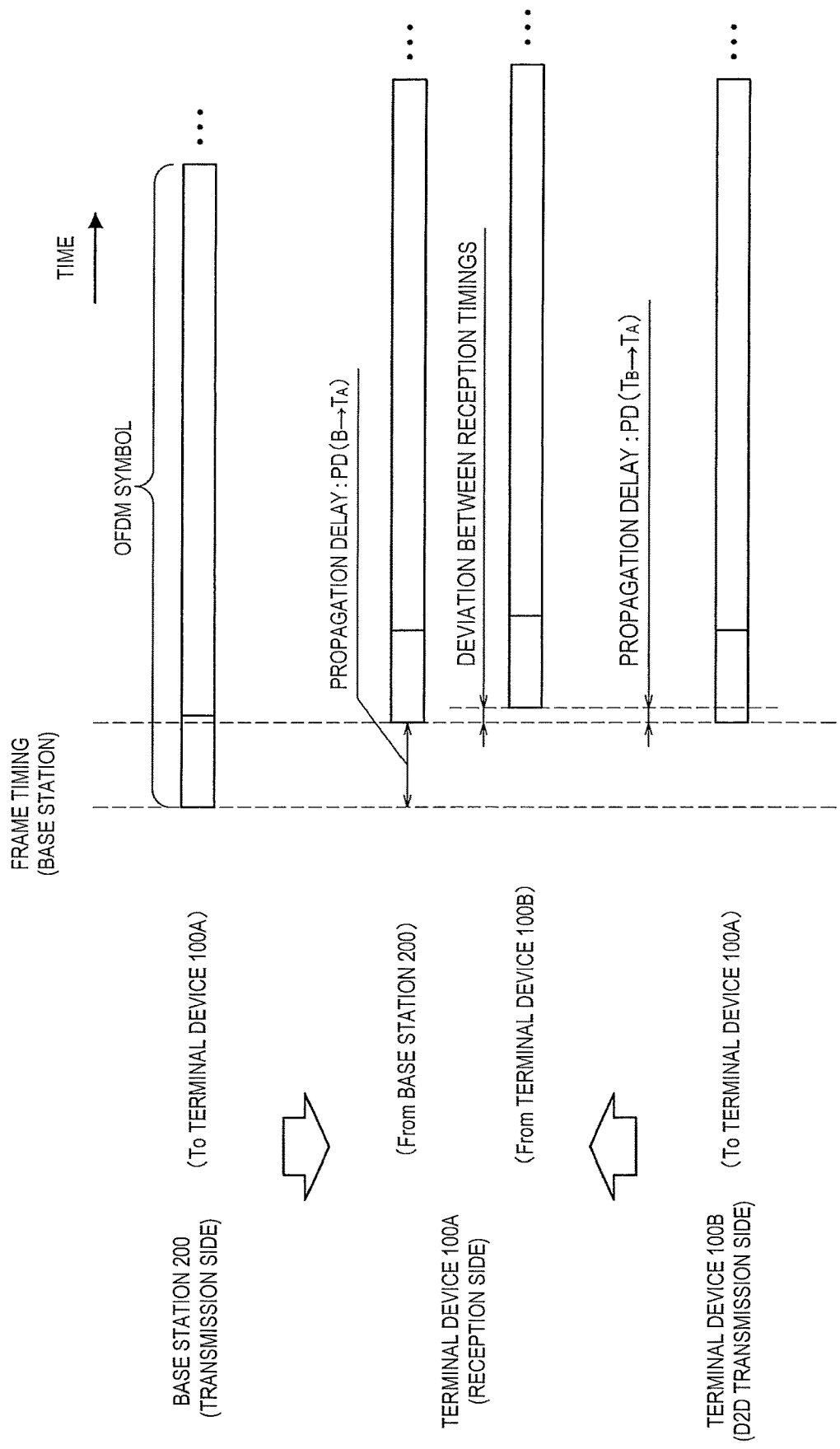
FIG. 16 is a first explanatory diagram illustrating a third example of a D2D transmission timing according to an embodiment.

FIG. 16 is a first explanatory diagram illustrating a third example of the D2D transmission timing according to the embodiment. In the example of FIG. 16, the terminal device 100B is a transmission side device of the D2D communication and the terminal device 100A is a reception side device of the D2D communication. A downlink transmission timing at which the base station 200 transmits a downlink signal and a downlink reception timing at which the terminal device 100A receives the downlink signal are illustrated in FIG. 16. This point is the same as those of the examples illustrated in FIGS. 8, 12, and 14.

A D2D transmission timing at which the terminal device 100B transmits a D2D communication signal in the D2D communication and a D2D reception timing at which the terminal device 100A actually receives the D2D communication signal are also illustrated in FIG. 16. In this example, the D2D transmission timing of the terminal device 100B is almost the same as the downlink reception timing of the terminal device 100A. As a result, a deviation between the reception timings (that is, a deviation between the D2D reception timing and the downlink reception timing in the terminal device 100A) illustrated in FIG. 16 is less than the deviation between the reception timings illustrated in FIG. 8. In this example, the D2D reception timing is slightly later than the downlink reception timing. Accordingly, when a reception period of the downlink signal is set to be slightly longer than the length of the OFDM symbol, the terminal device 100A can properly receive the D2D communication signal.

Figure 17:
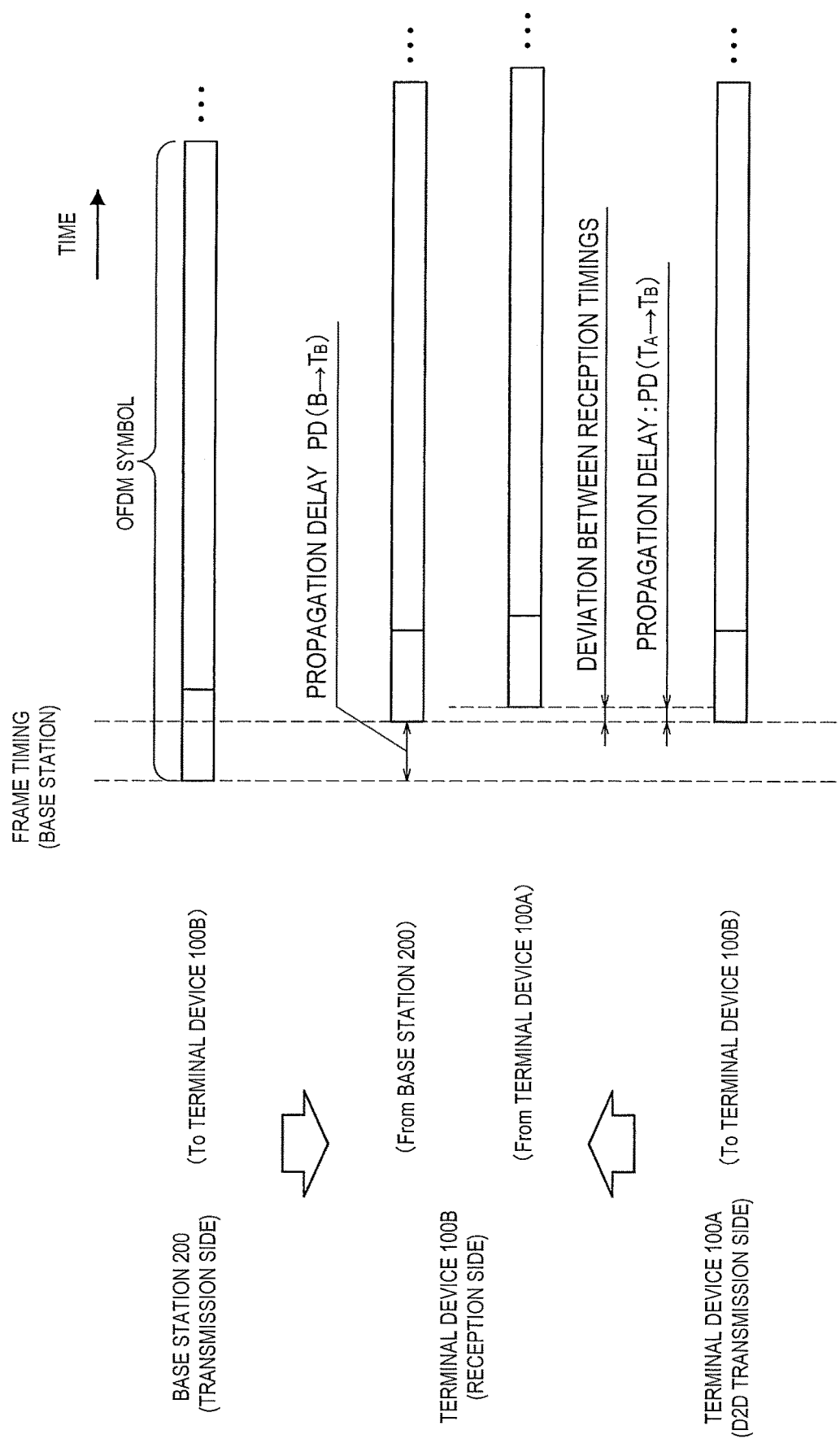
FIG. 17 is a second explanatory diagram illustrating a third example of a D2D transmission timing according to an embodiment.

FIG. 17 is a second explanatory diagram illustrating the third example of the D2D transmission timing according to the embodiment. In the example of FIG. 17, the terminal device 100A is a transmission side device of the D2D communication and the terminal device 100B is a reception side device of the D2D communication. A downlink transmission timing at which the base station 200 transmits a downlink signal and a downlink reception timing at which the terminal device 100B receives the downlink signal are illustrated in FIG. 17. This point is the same as that of the example illustrated in FIG. 9.

A D2D transmission timing at which the terminal device 100A transmits a D2D communication signal in the D2D communication and a D2D reception timing at which the terminal device 100B actually receives the D2D communication signal are also illustrated in FIG. 17. In this example, the D2D transmission timing of the terminal device 100A is almost the same as the downlink reception timing of the terminal device 100B. As a result, a deviation between the reception timings (that is, a deviation between the D2D reception timing and the downlink reception timing in the terminal device 100B) illustrated in FIG. 17 is less than the deviation between the reception timings illustrated in FIG. 9. In this example, the D2D reception timing is slightly later than the downlink reception timing. Accordingly, when a reception period of the downlink signal is set to be slightly longer than the length of the OFDM symbol, the terminal device 100B can properly receive the D2D communication signal.

Case of One-to-Multiple D2D Communication

Here, a D2D transmission timing of a case in which a terminal device 100 performs the D2D communication with two or more other terminal devices 100 will be described with reference to FIGS. 18 and 19.

Figure 18:
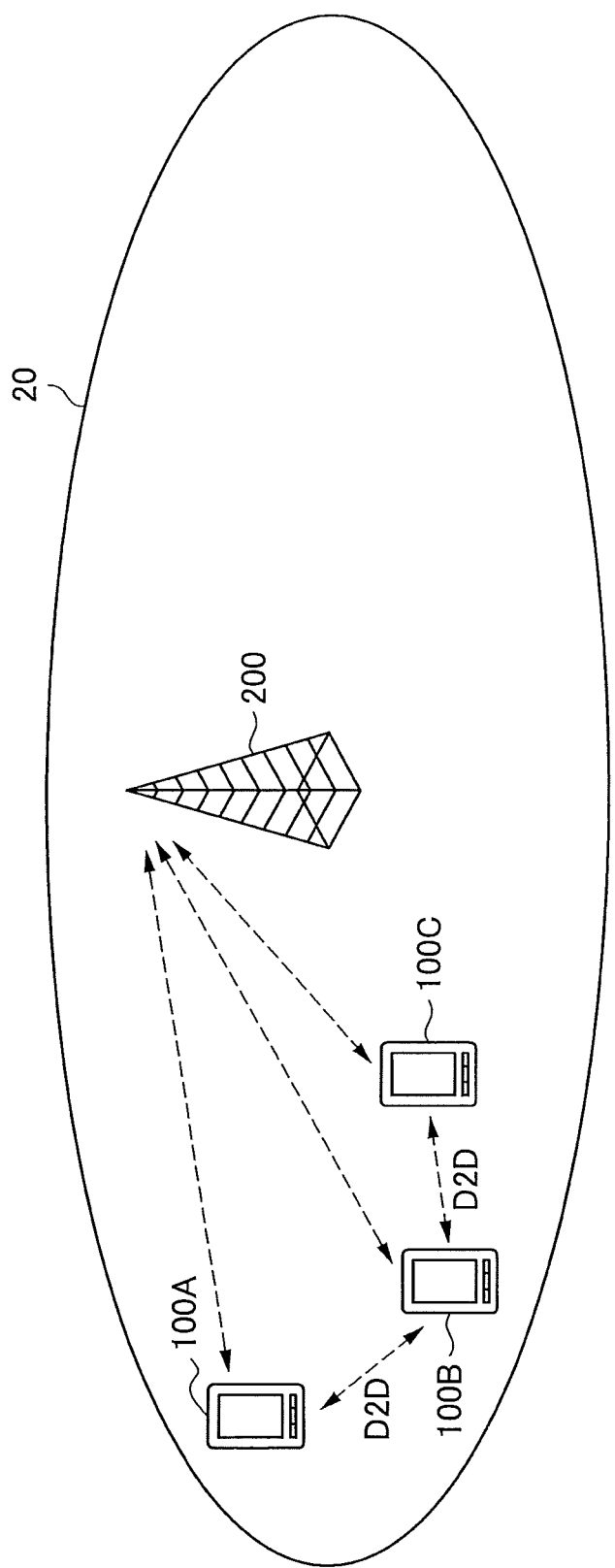
FIG. 18 is an explanatory diagram illustrating a first case in which a terminal device performs D2D communication with two or more other terminal devices.

FIG. 18 is an explanatory diagram illustrating a first case in which a terminal device performs D2D communication with two or more other terminal devices. In FIG. 18, a terminal device 100B performs the D2D communication with both of terminal devices 100A and 100C. As an example of this case, the terminal device 100B is connected to a content delivery server via the base station 200 and transmits content to the terminal devices 100A and 100C.

Figure 19:
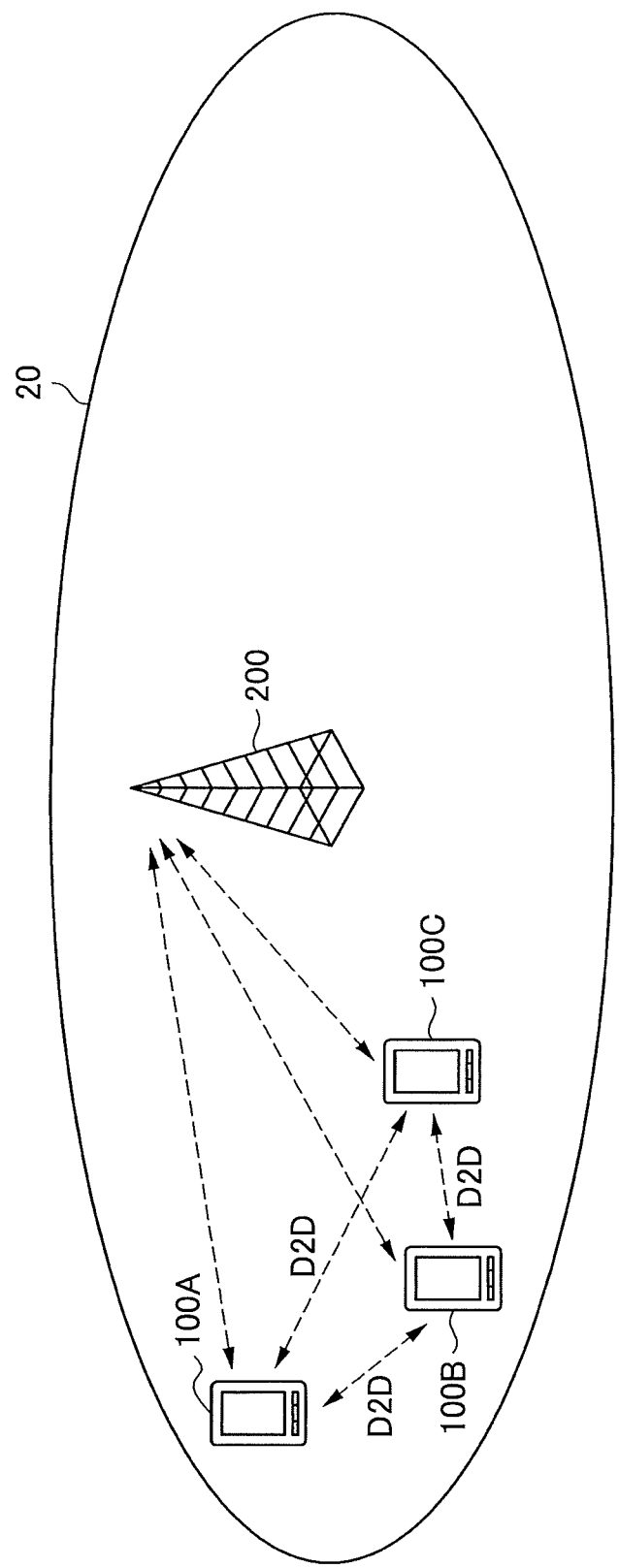
FIG. 19 is an explanatory diagram illustrating a second case in which a terminal device performs D2D communication with two or more other terminal devices.

FIG. 19 is an explanatory diagram illustrating a second case in which the terminal device performs the D2D communication with two or more other terminal devices. In FIG. 19, in the case of FIG. 18, the terminal devices 100A and 100C further mutually perform the D2D communication. As an example of this case, the terminal devices 100A, 100B, and 100C perform communication in a group.

As described above, when the terminal device 100 performs the D2D communication with two or more other terminal devices 100, it is preferable to apply the first example or the second example of the D2D transmission timing described above rather than applying the third example of the D2D transmission timing described above. This is because since the TA value of the communication partner of the D2D communication is acquired in the third example of the D2D transmission timing described above, the TA value of which the base station 200 notifies increases, and thus the process and communication increase and become complicated.

4. FLOW OF PROCESS

Figure 20:
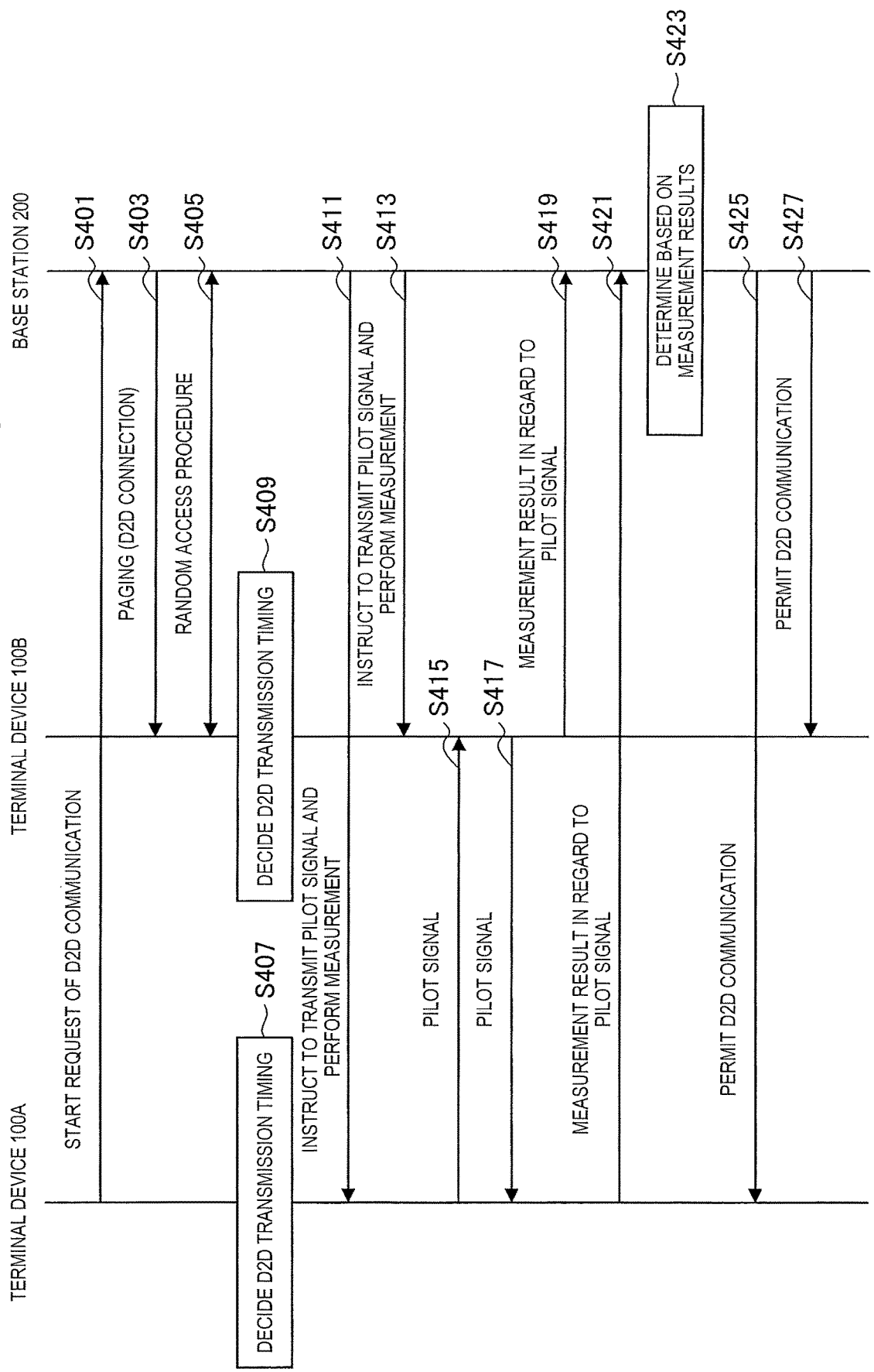
FIG. 20 is a sequence diagram illustrating an example of a schematic flow of a communication control process according to an embodiment.

Next, an example of the communication control process according to the embodiment will be described with reference to FIG. 20. FIG. 20 is a sequence diagram illustrating an example of a schematic flow of the communication control process according to the embodiment.

In step S401, the control unit 140 of the terminal device 100A causes the radio communication unit 120 to transmit a start request of the D2D communication. Then, the base station 200 receives the start request.

Next, in step S403, the base station 200 performs paging. In the paging, information indicating the D2D communication is transmitted. The terminal device 100B is called by the paging.

Then, in step S405, the terminal device 100B and the base station 200 perform a random access procedure. During the random access procedure, the control unit 140 of the terminal device 100B causes the radio communication unit 120 to transmit a random access request. The base station 200 transmits a random access response in response to the random access request. The base station 200 notifies the terminal device 100B of the TA value of the terminal device 100B in the random access response.

In step S407, the transmission timing decision unit 143 of the terminal device 100A decides the D2D transmission timing based on the downlink reception timing of the terminal device 100A and the TA value acquired in advance. For example, as in the first example of the D2D transmission timing described above, the downlink transmission timing of the base station 200 calculated from the downlink reception timing and the TA value is decided as the D2D transmission timing of the terminal device 100A.

In step S409, the transmission timing decision unit 143 of the terminal device 100B decides the D2D transmission timing based on the downlink reception timing of the terminal device 100B and the TA value acquired in the random access procedure. For example, as in the first example of the D2D transmission timing described above, the downlink transmission timing of the base station 200 calculated from the downlink reception timing and the TA value is decided as the D2D transmission timing of the terminal device 100B.

In step S411 and step S413, the base station 200 instructs the terminal devices 100A and 100B to transmit a pilot signal in the D2D communication and to perform measurement in regard to the pilot signal in the D2D communication.

In step S415, the control unit 140 of the terminal device 100A causes the radio communication unit 120 to transmit the pilot signal. Then, the radio communication unit 120 of the terminal device 100B receives the pilot signal and the control unit 140 of the terminal device 100B performs the measurement in regard to the pilot signal.

In step S417, the control unit 140 of the terminal device 100B causes the radio communication unit 120 to transmit the pilot signal. The radio communication unit 120 of the terminal device 100A receives the pilot signal and the control unit 140 of the terminal device 100A performs the measurement in regard to the pilot signal.

In step S419 and step S421, the terminal devices 100A and 100B report measurement results in regard to the pilot signal to the base station 200 via the radio communication unit 120.

In step S423, the base station 200 determines whether to permit the D2D communication based on the reported measurement results. For example, the base station 200 determines to permit the D2D communication when communication quality of the D2D communication satisfies a predetermined quality requirement.

In step S425 and step S427, the base station 200 notifies the terminal devices 100A and 100B of the permission of the D2D communication. Thereafter, the D2D communication starts between the terminal devices 100A and 100B.

One example of the communication control process according to the embodiment has been described. When the third example of the D2D transmission timing described above is used, the base station 200 notifies the terminal device 100A of the TA value of the terminal device 100B before step S407 and notifies the terminal device 100B of the TA value of the terminal device 100A before step S409.

5. MODIFICATION EXAMPLES

Next, modification examples of the embodiment will be described with reference to FIGS. 21 to 24.

In the above-described embodiment, the example in which two terminal devices 100 (for example, the terminal devices 100A and 100B) performing the D2D communication are located within the same cell has been described. Accordingly, examples in which two terminal devices 100 performing the D2D communication are located within different cells will be described as modification examples of the embodiment.

(Example of Cells in which Terminal Devices Performing D2D Communication are Located)

First, a specific example of cells which is a premise will be described with reference to FIGS. 21 and 22.

Figure 21:
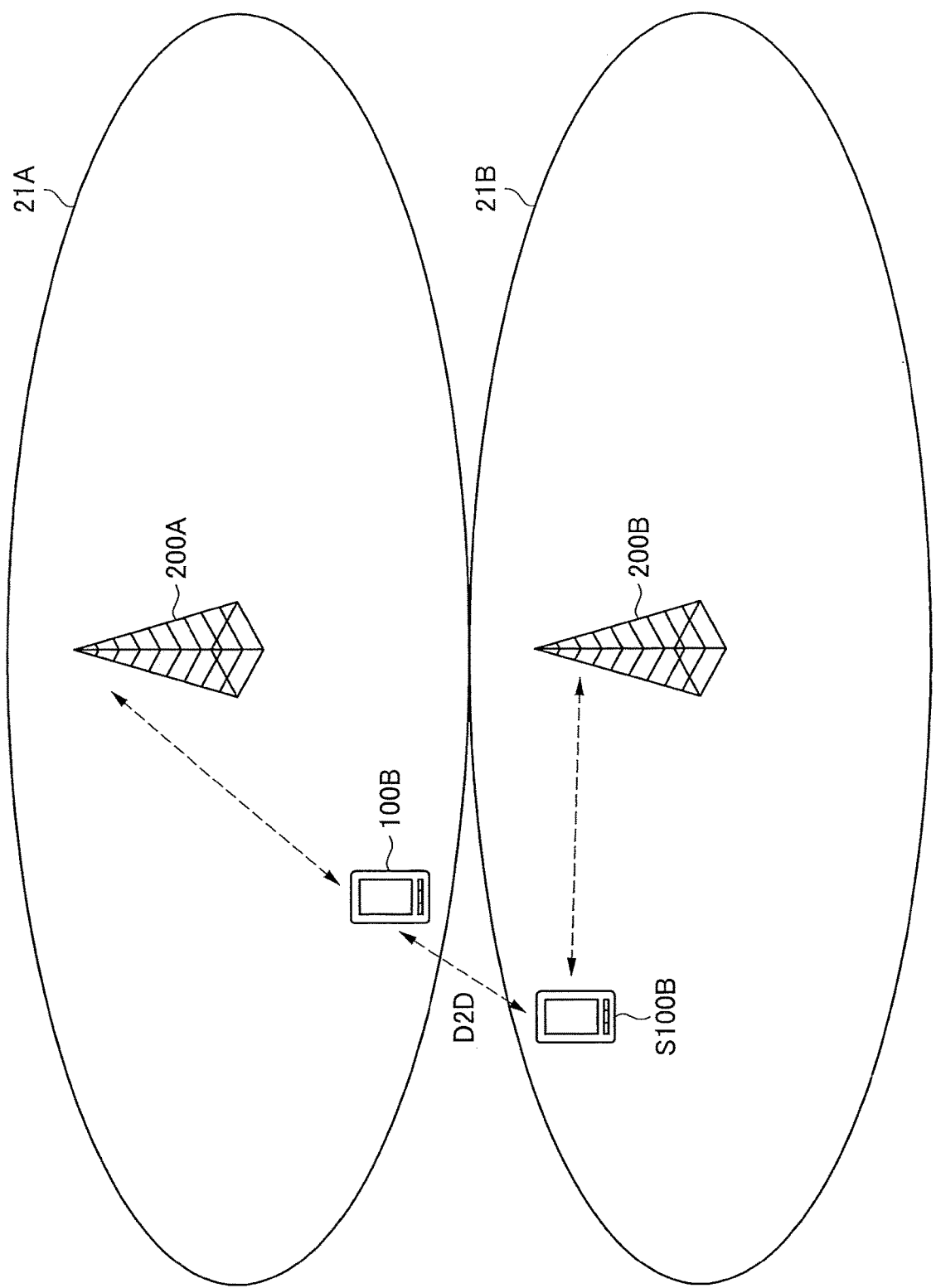
FIG. 21 is an explanatory diagram illustrating a first example of cells when terminal devices performing the D2D communication are located in different cells.

FIG. 21 is an explanatory diagram illustrating a first example of cells when the terminal devices performing the D2D communication are located in the different cells. Adjacent cells 21A and 20B are illustrated in FIG. 21. The base station 200A of the cell 21A and the terminal device 100A located in the cell 21A are illustrated. The base station 200B of the cell 21B and the terminal device 100B located in the cell 21B are illustrated. For example, thus, the terminal devices 100 performing the D2D communication are located in the two mutually adjacent cells 21.

Figure 22:
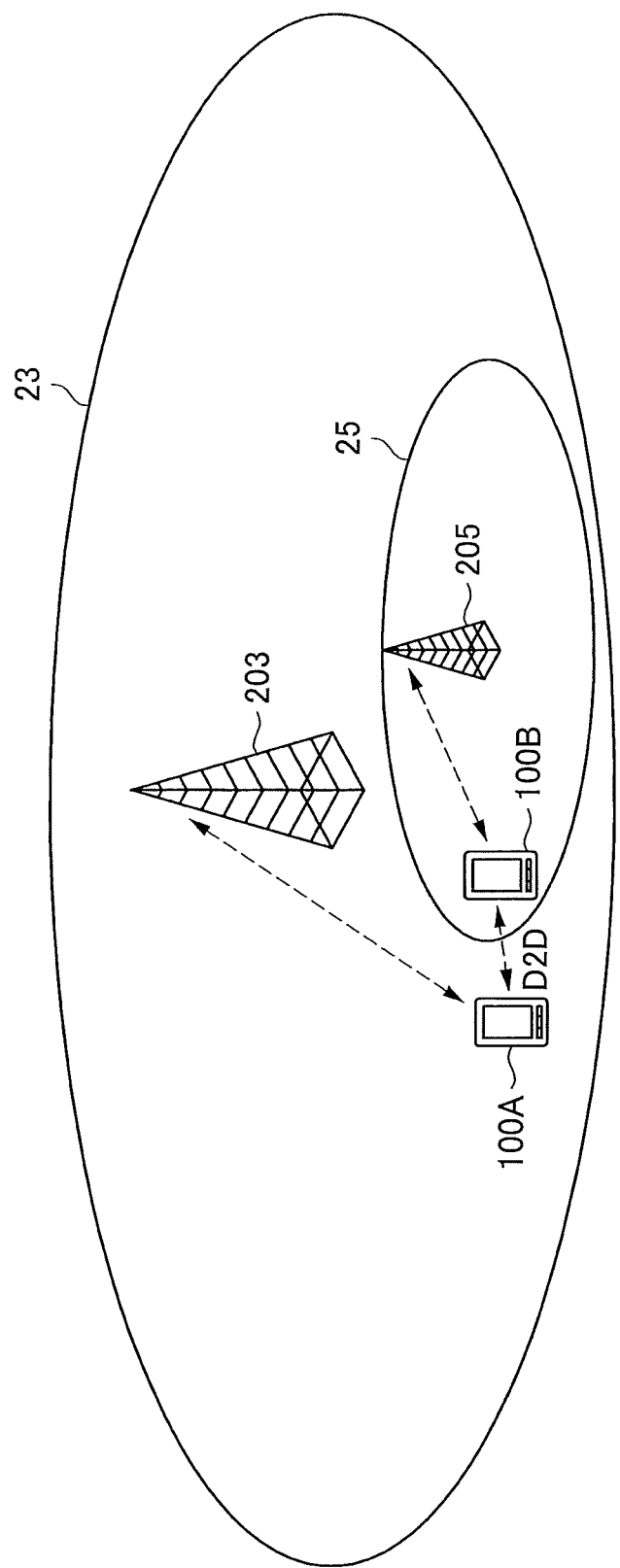
FIG. 22 is an explanatory diagram illustrating a second example of cells when terminal devices performing the D2D communication are located in different cells.

FIG. 22 is an explanatory diagram illustrating a second example of cells when the terminal devices performing the D2D communication are located in the different cells. A macro cell 23 and a small cell 25 overlapping with the macro cell 23 are illustrated in FIG. 22. A base station 203 of the macro cell 23 and the terminal device 100A located within the macro cell 23 are illustrated. A base station 205 of the small cell 25 and the terminal device 100B located within the small cell 25 are illustrated. For example, thus, the terminal devices 100 performing the D2D communication are located in the macro cell 23 and the small cell 25, respectively.

As in the above-described example, even when two terminal devices 100 performing the D2D communication are located within different cells, a proper D2D transmission timing can be decided. Modification examples of the embodiment will be described below using the example of FIG. 21 as the premise. This description can also be applied similarly to the example of FIG. 22.

Since a decision scheme when transmission and reception timings between two cells are synchronized and a decision scheme when transmission and reception timings between two cells are not synchronized are slightly different, the two cases will be described.

(When Synchronization is Achieved Between Cells)

When the synchronization is achieved between the cells, the downlink transmission timings by the base station 200 between the cells 21 are the same. As in the case in which two terminal devices 100 performing the D2D communication are located in the same cell, the D2D transmission timing can be decided. For example, as in the first to third examples of the D2D transmission timing described above, the D2D transmission timing can be decided.

In the third example of the D2D transmission timing, as described above, the terminal device 100A (the transmission timing decision unit 143) decides the D2D transmission timing based on the downlink reception timing of the terminal device 100A, the TA information of the terminal device 100A, and the TA information of the other terminal device 100B. The TA information of the terminal device 100A is TA information of the terminal device 100A in the cell 21A in which the terminal device 100 is located. On the other hand, when the terminal devices 100A and 100B performing the D2D communication are located within different cells, the TA information of the terminal device 100B is TA information of the terminal device 100B in the cell 21B in which the terminal device 100B is located. Therefore, the base station 200B transmits the TA information of the terminal device 100B to the base station 200A, and then the base station 200A transmits the TA information of the terminal device 100B to the terminal device 100A. Then, the terminal device 100A (the information acquisition unit 141) acquires the TA information of the terminal device 100B.

(When Synchronization is not Achieved Between Cells)

When the synchronization is not achieved between the cells, the downlink transmission timings by the base station 200 between the cells 21 are different. Therefore, the followings are different compared to the case in which two terminal devices 100 performing the D2D communication are located in the same cell.

First Example of D2D Transmission Timing

In the first example of the D2D transmission timing, as described above, the terminal device 100A decides the D2D transmission timing based on the downlink reception timing of the terminal device 100A and the TA information of the terminal device 100A. When the terminal devices 100A and 100B performing the D2D communication are located within different cells, the downlink reception timing of the terminal device 100A and the TA information of the terminal device 100A are as follows.

First, the downlink reception timing of the terminal device 100A is a reception timing at which the terminal device 100A receives the downlink signal (that is, the downlink signal of the cell 21B) from the base station 200B performing radio communication with the terminal device 100B. Therefore, the information acquisition unit 141 of the terminal device 100A causes the radio communication unit 120 to receive the downlink signal (for example, a primary synchronization signal, a secondary synchronization signal, or the like) of the cell 21B and acquires the reception timing of the downlink signal.

The TA information of the terminal device 100A is TA information (that is, TA information of the terminal device 100A in the cell 21B) used to decide a timing at which the terminal device 100A transmits an uplink signal to the base station 200B. Therefore, the information acquisition unit 141 causes the terminal device 100A to perform random access to the cell 21B and acquires the TA information of the terminal device 100A in the cell 21B.

According to the downlink reception timing of the terminal device 100A and the TA information of the terminal device 100A, the terminal device 100A can calculate, for example, a timing at which the base station 200B transmits the downlink signal. That is, the terminal device 100A can calculate the downlink transmission timing in the cell 21B in which the terminal device 100B which is a partner side device of the D2D communication is located.

Using the fact that the terminal devices 100A and 100B are located nearby as the premise, the information acquisition unit 141 may acquire and use the TA information of the terminal device 100B in the cell 21B as a substitute of the TA information of the terminal device 100A in the cell 21B.

In this case, the base station 200B may transmit the TA information of the terminal device 100B to the base station 200A and the base station 200A may transmit the TA information of the terminal device 100B to the terminal device 100A.

Second Example of D2D Transmission Timing

In the second example of the D2D transmission timing, as described above, the terminal device 100A decides the D2D transmission timing based on the downlink reception timing of the terminal device 100A. When the terminal devices 100A and 100B performing the D2D communication are located within different cells, the downlink reception timing of the terminal device 100A is as follows.

As in the first example of the D2D transmission timing described above, the downlink reception timing of the terminal device 100A is a reception timing at which the terminal device 100A receives the downlink signal of the cell 21B.

According to the downlink reception timing of the terminal device 100A, the terminal device 100A can know a reception timing at which the terminal device 100A receives the downlink signal from the base station 21B. That is, the terminal device 100A can calculate the downlink transmission timing in the cell 21B in which the terminal device 100B which is a partner side device of the D2D communication is located.

Third Example of D2D Transmission Timing

In the third example of the D2D transmission timing, as described above, the terminal device 100A decides the D2D transmission timing based on the downlink reception timing of the terminal device 100A, the TA information of the terminal device 100A, and the TA information of the terminal device 100B. When the terminal devices 100A and 100B performing the D2D communication are located within different cells, the downlink reception timing of the terminal device 100A, the TA information of the terminal device 100A, the TA information of the terminal device 100B are as follows.

First, the downlink reception timing of the terminal device 100A is a reception timing at which the terminal device 100A receives the downlink signal of the cell 21B as in the first example of the D2D transmission timing described above. The TA information of the terminal device 100A is TA information of the terminal device 100A in the cell 21B as in the first example of the D2D transmission timing described above.

The TA information of the terminal device 100B is TA information (that is, TA information of the terminal device 100B in the cell 21B) used to decide a timing at which the terminal device 100B transmits an uplink signal to the base station 200B. Therefore, the base station 200B transmits the TA information of the terminal device 100B to the base station 200A and the base station 200A transmits the TA information of the terminal device 100B to the terminal device 100A. Then, the information acquisition unit 141 acquires the TA information of the terminal device 100B.

According to the downlink reception timing of the terminal device 100A, the TA information of the terminal device 100A, and the TA information of the terminal device 100B, the terminal device 100A can calculate, for example, a timing at which the terminal device 100B which is a partner side device of the D2D communication receives the downlink signal from the base station 200B. That is, the terminal device 100A can calculate a timing at which the terminal device 100B receives the downlink signal of the cell 21B.

(Flow of Process)

Next, examples of the communication control process according to modification examples of the embodiment will be described with reference to FIGS. 23 and 24.

When Synchronization is Achieved Between Cells

Figure 23:
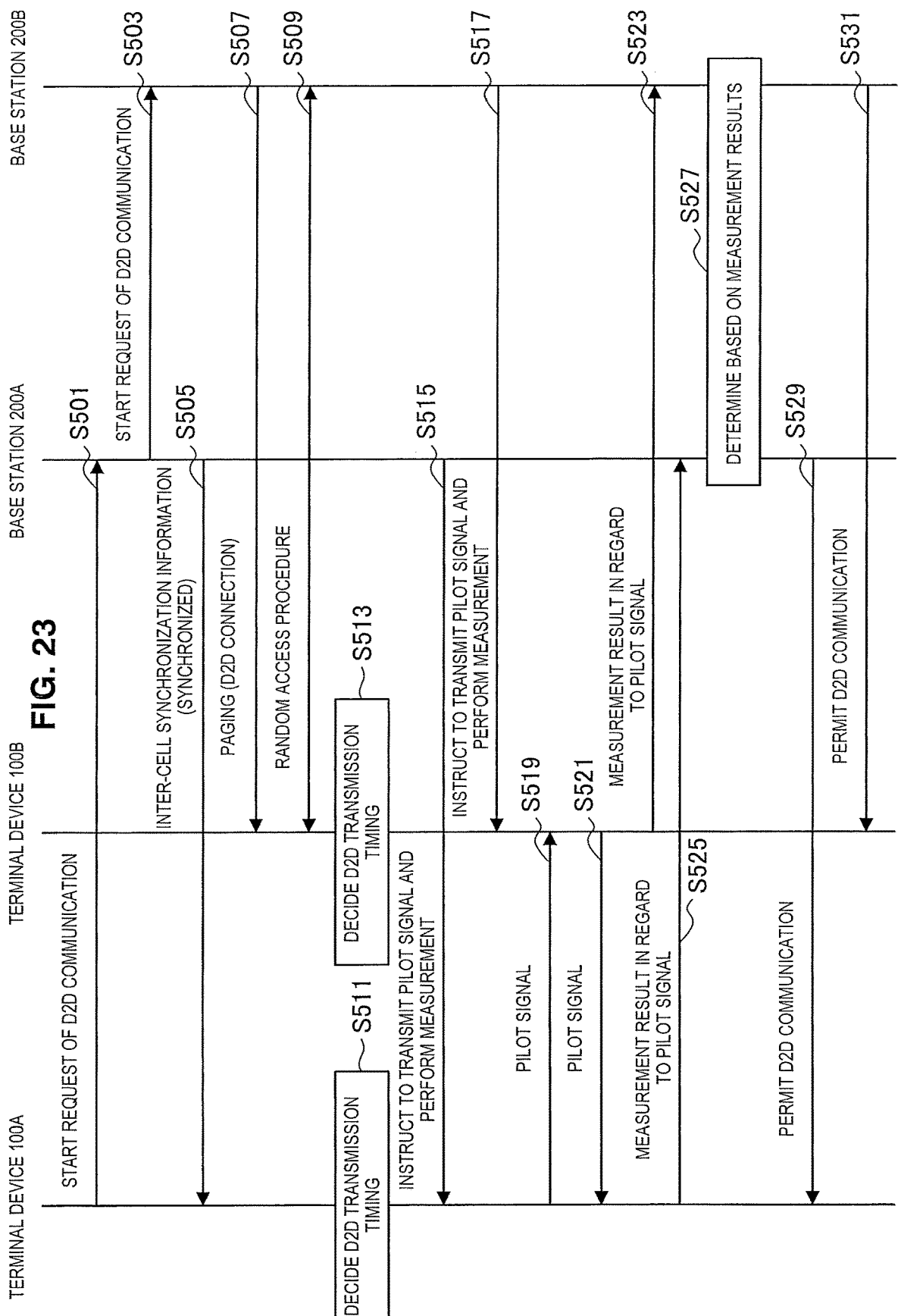
FIG. 23 is a sequence diagram illustrating a first example of a schematic flow of a communication control process according to a modification example of an embodiment.

FIG. 23 is a sequence diagram illustrating a first example of a schematic flow of the communication control process according to a modification example of the embodiment.

In step S501, the control unit 140 of the terminal device 100A causes the radio communication unit 120 to transmit a start request of the D2D communication. Then, the base station 200A receives the start request. Then, in step S503, the base station 200A transmits the start request to the base station 200B.

In step S505, the base station 200A transmit inter-cell synchronization information indicating whether the cells 21A and 21B are synchronized, to the terminal device 100A. In this case, the inter-cell synchronization information indicates that the cells 21A and 21B are synchronized. In this way, the terminal device 100A knows that the cells 21A and 21B are synchronized. In this example, the inter-cell synchronization information is acquired in step S505, but the acquisition of the inter-cell synchronization information is not limited to this example. The inter-cell synchronization information may be announced in advance using the system information to the terminal device 100 or may be announced in advance separately using signaling from the base station 200 to the terminal device 100. When all of the cells or some of the cells in the system are synchronized, information regarding whether synchronization is achieved between the cells may be stored in the terminal devices 100.

In step S507, the base station 200B perform paging. In the paging, information indicating the D2D communication is transmitted. The terminal device 100B is called by the paging.

Then, in step S509, the terminal device 100B and the base station 200B perform a random access procedure. During the random access procedure, the control unit 140 of the terminal device 100B causes the radio communication unit 120 to transmit a random access request. The base station 200B transmits a random access response in response to the random access request. The base station 200B notifies the terminal device 100B of the TA value of the terminal device 100B in the random access response. The TA value is the TA value of the terminal device 100B in the cell 21B.

In step S511, the transmission timing decision unit 143 of the terminal device 100A decides the D2D transmission timing based on the downlink reception timing of the terminal device 100A in the cell 21A and the TA value (the TA value of the terminal device 100A in the cell 21A) acquired in advance. For example, as in the first example of the D2D transmission timing described above, the downlink transmission timing of the base station 200A calculated from the downlink reception timing and the TA value is decided as the D2D transmission timing of the terminal device 100A.

In step S513, the transmission timing decision unit 143 of the terminal device 100B decides the D2D transmission timing based on the downlink reception timing of the terminal device 100B in the cell 21B and the TA value (the TA value of the terminal device 100B in the cell 21B) acquired in the random access procedure. For example, as in the first example of the D2D transmission timing described above, the downlink transmission timing of the base station 200B calculated from the downlink reception timing and the TA value is decided as the D2D transmission timing of the terminal device 100B.

In step S515, the base station 200A instructs the terminal device 100A to transmit the pilot signal in the D2D communication and perform measurement in regard to the pilot signal in the D2D communication.

In step S517, the base station 200B instructs the terminal device 100B to transmit the pilot signal in the D2D communication and perform measurement in regard to the pilot signal in the D2D communication.

In step S519, the control unit 140 of the terminal device 100A causes the radio communication unit 120 to transmit the pilot signal. Then, the radio communication unit 120 of the terminal device 100B receives the pilot signal and the control unit 140 of the terminal device 100B performs the measurement in regard to the pilot signal.

In step S521, the control unit 140 of the terminal device 100B causes the radio communication unit 120 to transmit the pilot signal. The radio communication unit 120 of the terminal device 100A receives the pilot signal and the control unit 140 of the terminal device 100A performs the measurement in regard to the pilot signal.

In step S523, the terminal device 100B reports a measurement result in regard to the pilot signal to the base station 200B via the radio communication unit 120.

In step S525, the terminal device 100A reports a measurement result in regard to the pilot signal to the base station 200A via the radio communication unit 120.

In step S527, the base stations 200A and 200B determine whether to permit the D2D communication based on the reported measurement results. For example, the base stations 200A and 200B determine to permit the D2D communication when communication quality of the D2D communication satisfies a predetermined quality requirement.

In step S529, the base station 200A notifies the terminal device 100A of the permission of the D2D communication. In step S531, the base station 200B notifies the terminal device 100B of the permission of the D2D communication. Thereafter, the D2D communication starts between the terminal devices 100A and 100B.

The first example of the communication control process according to the modification example of the embodiment has been described. When the third example of the D2D transmission timing described above is used, the base station 200A notifies the terminal device 100A of the TA value of the terminal device 100B in the cell 21B before step S511. The base station 200B notifies the terminal device 100B of the TA value of the terminal device 100A in the cell 21A before step S513.

When Synchronization is not Achieved Between Cells

Figure 24:
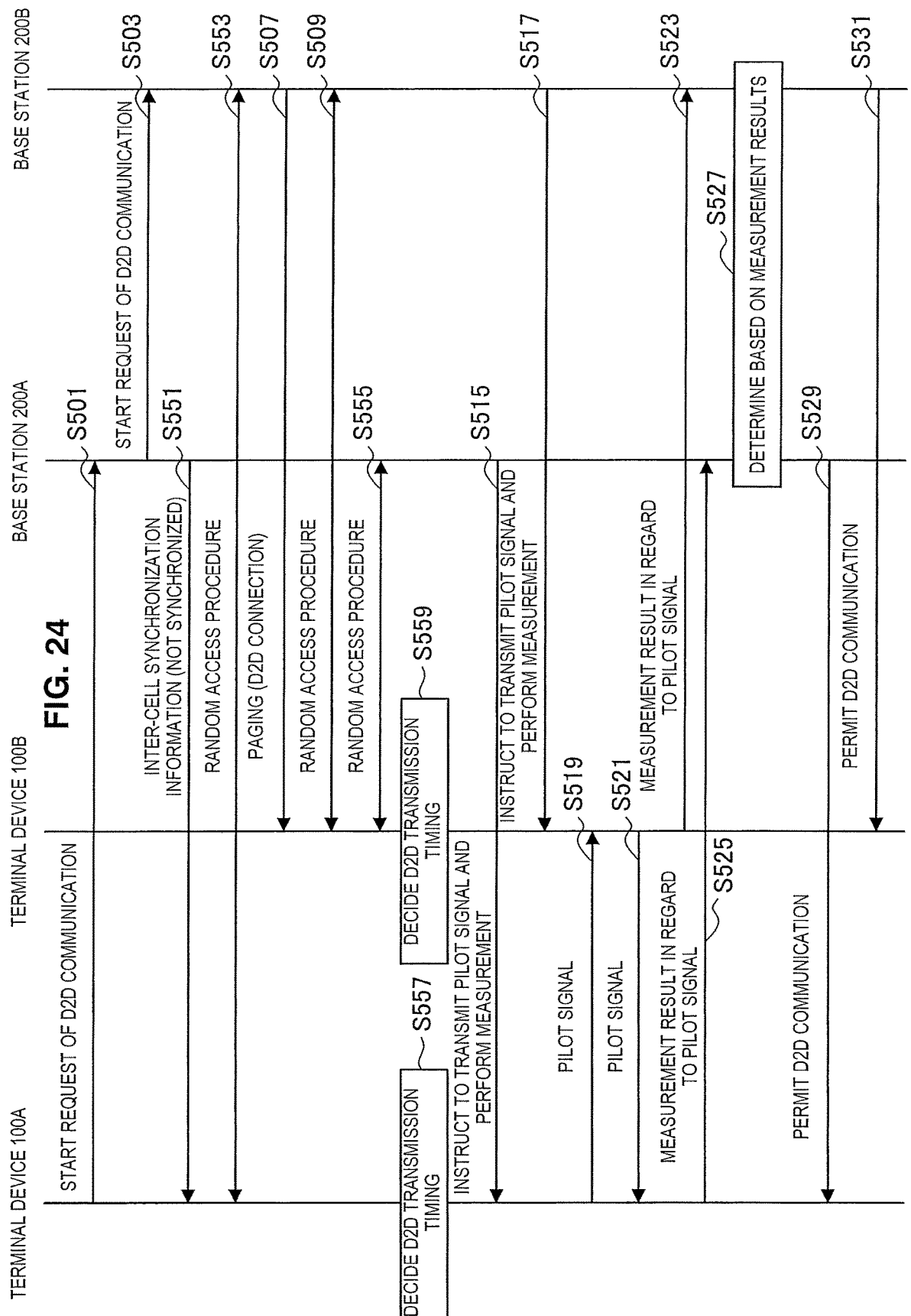
FIG. 24 is a sequence diagram illustrating a second example of a schematic flow of a communication control process according to a modification example of an embodiment.

FIG. 24 is a sequence diagram illustrating a second example of the schematic flow of the communication control process according to a modification example of the embodiment. Here, only step S551, step S553, step S555, step S557, and step S559 which are differences between the first example of the schematic flow of the communication control process illustrated in FIG. 23 and the second example of the schematic flow of the communication control process illustrated in FIG. 24 will be described.

In step S551, the base station 200A transmits inter-cell synchronization information indicating whether the cells 21A and 21B are synchronized, to the terminal device 100A. In this example, the inter-cell synchronization information indicates that the cells 21A and 21B are not synchronized. In this way, the terminal device 100A knows that the cells 21A and 21B are not synchronized. In this example, the inter-cell synchronization information is acquired in step S551, but the acquisition of the inter-cell synchronization information is not limited to this example. The inter-cell synchronization information may be announced in advance using the system information to the terminal device 100 or may be announced in advance separately using signaling from the base station 200 to the terminal device 100. When all of the cells or some of the cells in the system are synchronized, information regarding whether synchronization is achieved between the cells may be stored in the terminal devices 100.

Then, in step S553, the terminal device 100A and the base station 200B perform a random access procedure. During the random access procedure, the control unit 140 of the terminal device 100A causes the radio communication unit 120 to transmit a random access request. The base station 200B transmits a random access response in response to the random access request. The base station 200B notifies the terminal device 100A of the TA value of the terminal device 100A in the random access response. The TA value is the TA value of the terminal device 100A in the cell 21B.

Then, in step S555, the terminal device 100B and the base station 200A perform a random access procedure. During the random access procedure, the control unit 140 of the terminal device 100B causes the radio communication unit 120 to transmit a random access request. The base station 200A transmits a random access response in response to the random access request. The base station 200A notifies the terminal device 100B of the TA value of the terminal device 100B in the random access response. The TA value is the TA value of the terminal device 100B in the cell 21A.

In step S557, the transmission timing decision unit 143 of the terminal device 100A decides the D2D transmission timing based on the downlink reception timing of the terminal device 100A in the cell 21B and the TA value (the TA value of the terminal device 100A in the cell 21B) acquired in the random access procedure. For example, as in the first example of the D2D transmission timing described above, the downlink transmission timing of the base station 200B calculated from the downlink reception timing and the TA value is decided as the D2D transmission timing of the terminal device 100A.

In step S559, the transmission timing decision unit 143 of the terminal device 100B decides the D2D transmission timing based on the downlink reception timing of the terminal device 100B in the cell 21A and the TA value (the TA value of the terminal device 100B in the cell 21A) acquired in the random access procedure. For example, as in the first example of the D2D transmission timing described above, the downlink transmission timing of the base station 200A calculated from the downlink reception timing and the TA value is decided as the D2D transmission timing of the terminal device 100B.

The second example of the communication control process according to the modification example of the embodiment has been described. When the third example of the D2D transmission timing described above is used, the base station 200A notifies the terminal device 100A of the TA value of the terminal device 100B in the cell 21B before step S557. The base station 200B notifies the terminal device 100B of the TA value of the terminal device 100A in the cell 21A before step S559.

6. APPLICATION

The technology related to the present disclosure can be applied to various products. The terminal device 100 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 100 may also be realized as a terminal that conducts machine-to-machine (M2M) communication (also called a machine-type communication (MTC) terminal). Furthermore, the terminal device 100 may be a radio communication module mounted onboard these terminals (for example, an integrated circuit module configured on a single die).

For example, the base station 200 may be realized as one kind of evolved NodeB (eNB) such as a macro eNB or a small eNB. The small eNB may be an eNB that covers a smaller cell, such as a pico eNB, a micro eNB, or a home (pemto) eNB, than a macro cell. Instead, the base station 200 may be realized as another kind of base station such as a NodeB or a base transceiver station (BTS). The base station 200 may include a main body (also referred to as a base station device) controlling radio communication and at least one remote radio head (RRH) disposed at a different location than the main body. The above-described various kinds of terminals may perform a base station function temporarily or semi-permanently to operate as the base station 200.

<<6.1. Applications Related to Terminal Device>>

(First Application)

Figure 25:
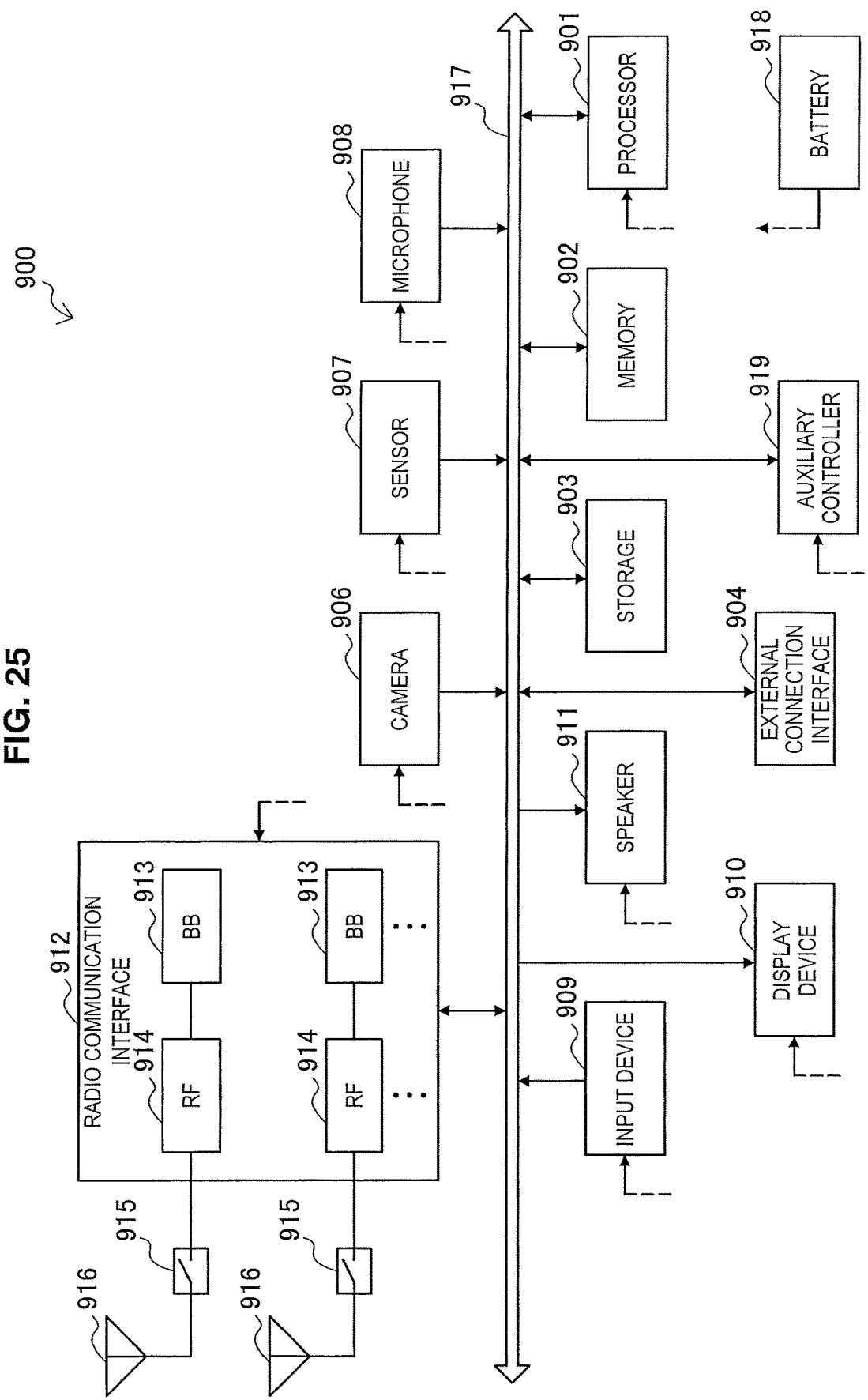
FIG. 25 is a block diagram illustrating an example of a schematic configuration of a smartphone to which technology according of the present disclosure may be applied.

FIG. 25 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 25. Note that although FIG. 25 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as illustrated in FIG. 25. Note that although FIG. 25 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 25 via power supply lines partially illustrated with dashed lines in the drawing. The auxiliary controller 919 causes minimal functions of the smartphone 900 to operate while in a sleep mode, for example.

In the smartphone 900 illustrated in FIG. 25, the information acquisition unit 141 and the transmission timing decision unit 143 described with reference to FIG. 11 may be implemented in the radio communication interface 912. Also, at least some of these functions may also be implemented in the processor 901 or the auxiliary controller 919.

(Second Application)

Figure 26:
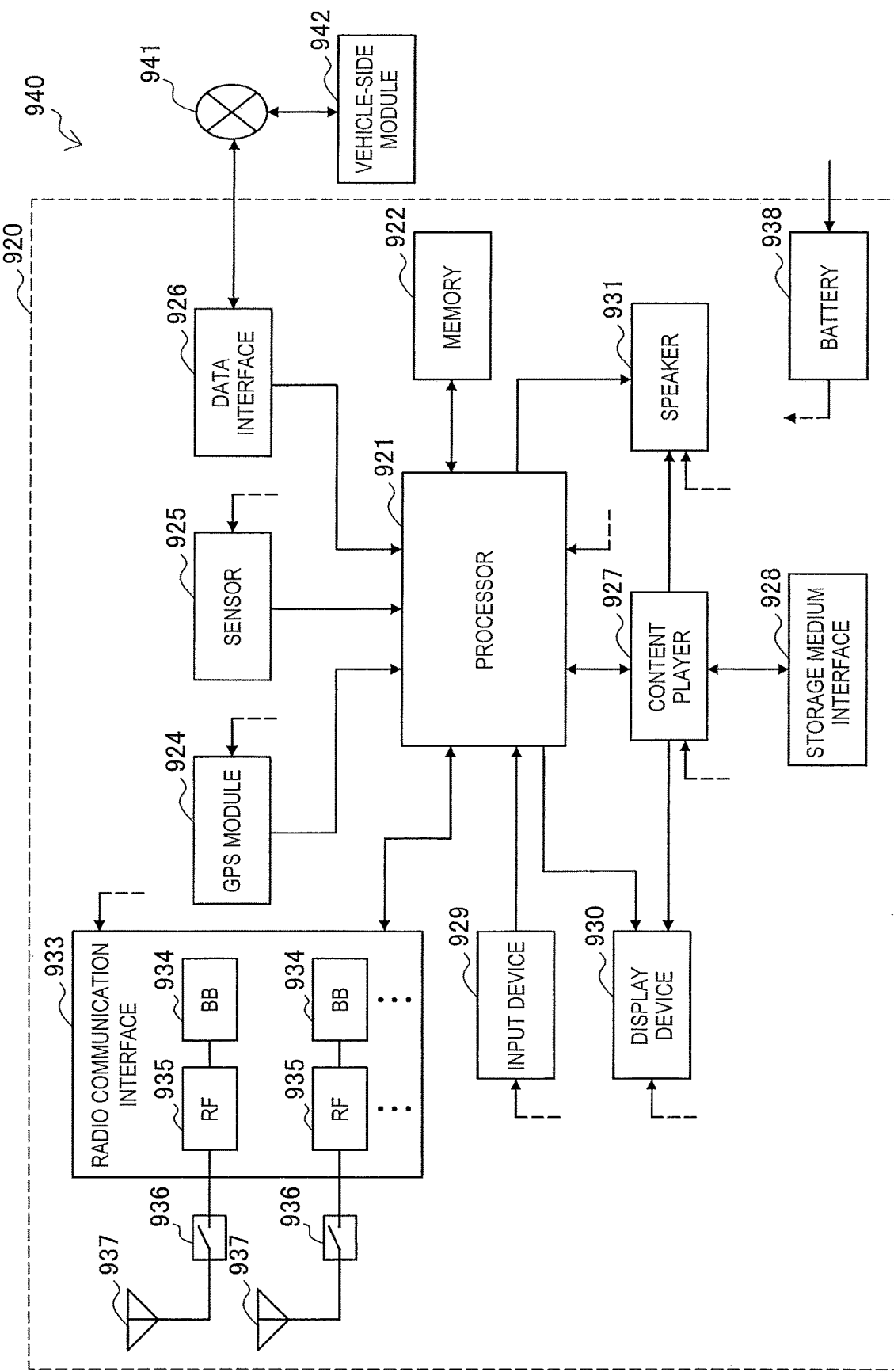
FIG. 26 is a block diagram illustrating an example of a schematic configuration of a car navigation device to which technology according to the present disclosure may be applied.

FIG. 26 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as illustrated in FIG. 26. Note that although FIG. 26 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as illustrated in FIG. 26. Note that although FIG. 26 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 26 via power supply lines partially illustrated with dashed lines in the drawing. Also, the battery 938 stores electric power supplied from the vehicle.

In the car navigation device 920 illustrated in FIG. 26, the information acquisition unit 141 and the transmission timing decision unit 143 described with reference to FIG. 11 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

<<10.1. Applications Related to Base Station>>

(First Application)

Figure 27:
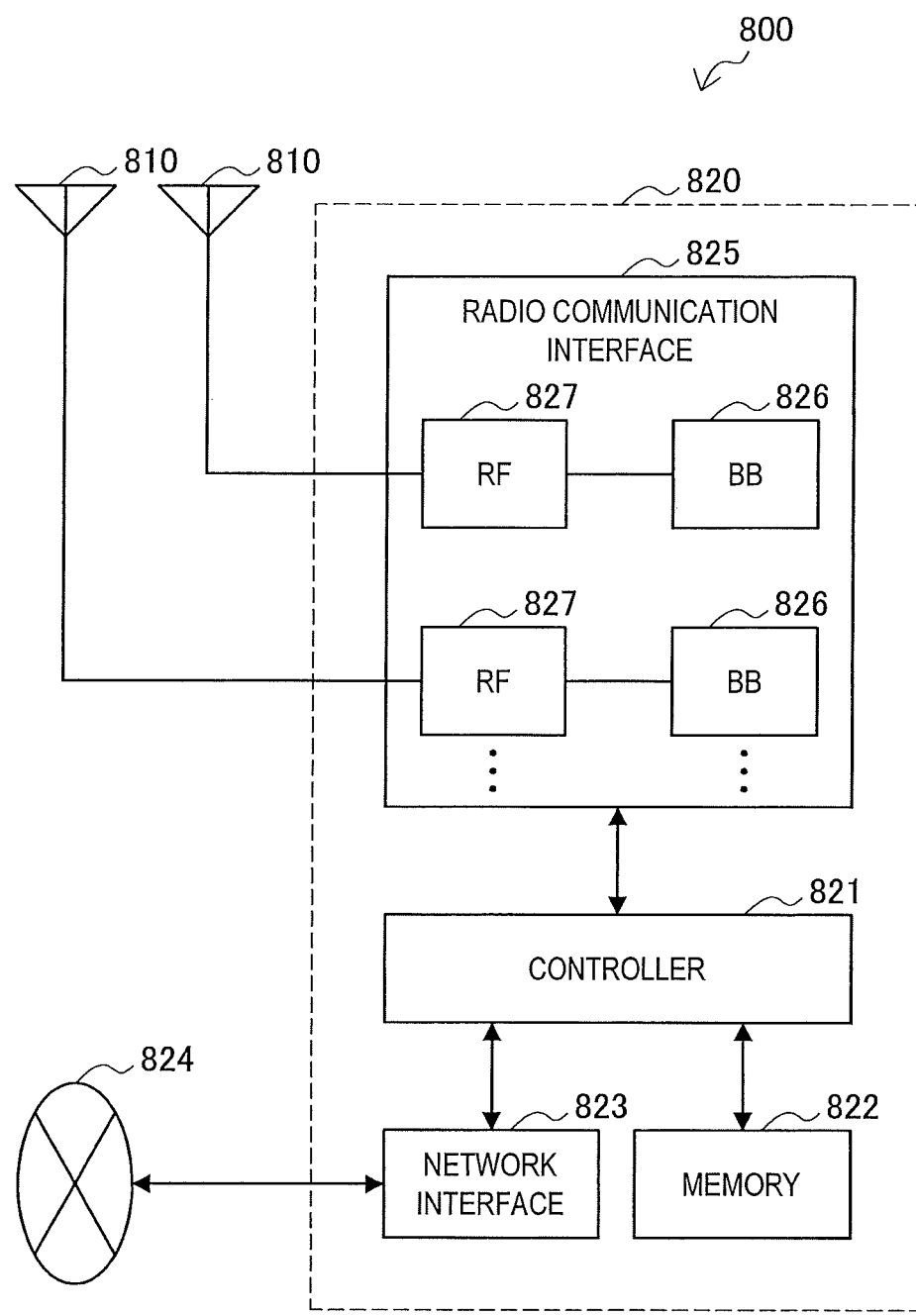
FIG. 27 is a block diagram illustrating a first example of a schematic configuration of an eNB to which the technology of the present disclosure is applied.

FIG. 27 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as illustrated in FIG. 27, and the plurality of antennas 810 may respectively correspond to a plurality of frequency bands used by the eNB 800, for example. Note that although FIG. 27 illustrates an example of the eNB 800 including a plurality of antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as illustrated in FIG. 27, and the plurality of BB processors 826 may respectively correspond to a plurality of frequency bands used by the eNB 800, for example. In addition, the radio communication interface 825 may also include a plurality of RF circuits 827 as illustrated in FIG. 27, and the plurality of RF circuits 827 may respectively correspond to a plurality of antenna elements, for example. Note that although FIG. 27 illustrates an example of the radio communication interface 825 including a plurality of BB processors 826 and a plurality of RF circuits 827, the radio communication interface 825 may also include a single BB processor 826 or a single RF circuit 827.

(Second Application)

Figure 28:
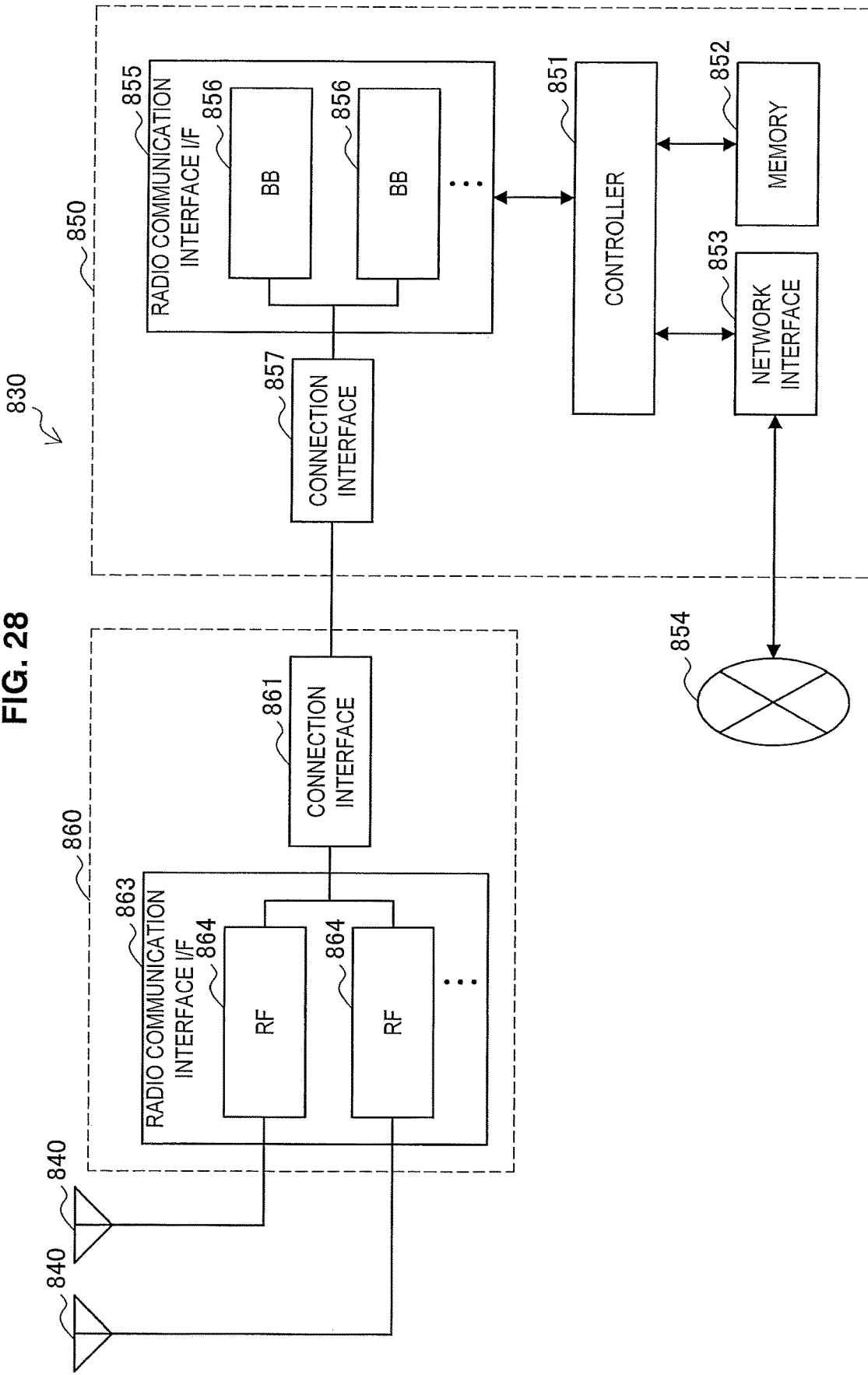
FIG. 28 is a block diagram illustrating a second example of a schematic configuration of an eNB to which the technology of the present disclosure is applied.

FIG. 28 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as illustrated in FIG. 28, and the plurality of antennas 840 may respectively correspond to a plurality of frequency bands used by the eNB 830, for example. Note that although FIG. 28 illustrates an example of the eNB 830 including a plurality of antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 27.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 27, except for being connected to an RF circuit 864 of the RRH 860 via the connection interface 857. The radio communication interface 855 may also include a plurality of BB processors 856 as illustrated in FIG. 28, and the plurality of BB processors 856 may respectively correspond to a plurality of frequency bands used by the eNB 830, for example. Note that although FIG. 28 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as illustrated in FIG. 28, and the plurality of RF circuits 864 may respectively correspond to a plurality of antenna elements, for example. Note that although FIG. 28 illustrates an example of the radio communication interface 863 including a plurality of RF circuits 864, the radio communication interface 863 may also include a single RF circuit 864.

The example in which the terminal device 100 decides the D2D transmission timing of the own device has been described. However, instead of the terminal device 100, the base station 200 may decide a D2D transmission timing of the terminal device 100 and notify the terminal device 100 of the transmission timing. That is, the information acquisition unit 141 and the transmission timing decision unit 143 descried with reference to FIG. 11 may not be included by terminal device 100, but may be instead included by the base station 200. In this case, in the eNB 800 and the eNB 830 illustrated in FIGS. 28 and 29, the information acquisition unit 141 and the transmission timing decision unit 143 described with reference to FIG. 11 may be implemented in the radio communication interface 825 as well as the radio communication interface 855 and/or the radio communication interface 863. Also, at least some of these functions may also be implemented in the controller 821 and the controller 851.

7. CONCLUSION

The communication devices and each process according to the embodiment have been described above with reference to FIGS. 1 to 24. According to the embodiment of the present disclosure, the reception timing (that is, the downlink reception timing) at which the terminal device 100 receives the downlink signal from the base station 200 performing the radio communication with the terminal device 100 or the other terminal device 100 is acquired. The transmission timing (that is, the D2D transmission timing) at which the terminal device 100 performing the D2D communication transmits a signal to the other terminal device 100 is decided based on the acquired reception timing. Then, the decided D2D transmission timing is a timing later than the timing (that is, the uplink transmission timing) at which the terminal device 100 transmits the uplink signal.

When the D2D transmission timing of a transmission side device of the D2D communication is the same as the uplink transmission timing, the D2D communication signal may arrive at a reception side device quite earlier than the downlink reception timing of the reception side device of the D2D communication. For this reason, there is a possibility of a portion other than the CP in the D2D communication signal not being demodulated according to distances between the base station 200, and the reception side device and the transmission side device and the distance between the reception side device and the transmission side device.

On the other hand, in the embodiment, when the D2D transmission timing is a timing later than the uplink transmission timing, the downlink reception timing and the D2D reception timing of a partner side are closer. Accordingly, there is a high possibility of the D2D communication signal being properly received. In other words, it is possible to loosen constraints (for example, the distances between the base station 200, and the reception side device and the transmission side device and the distance between the reception side device and the transmission side device) for proper reception of the D2D communication signal. As a result, off-loading can be performed more effectively, which considerably contributes to an increase a system capacity.

For example, the TA information used to decide the timing (that is, the uplink transmission timing) at which the terminal device 100 transmits the uplink signal is further acquired. As the first example of the D2D transmission timing, the D2D transmission timing is decided based on the downlink reception timing of the terminal device 100 and the TA information of the terminal device 100.

Since the TA information (for example, the TA value) is an existing parameter of which the terminal device 100 is notified at the time of the random access, it is not necessary for the base station 200 to transmit a new control signal.

For example, the decided D2D transmission timing is the timing earlier than the downlink reception timing.

In this way, it is possible to prevent a period in which the partner device actually receives the D2D communication signal from not entering a period in which the partner device actually receives the downlink signal because the D2D transmission timing is too late.

For example, the decided D2D transmission timing is a timing later than a timing (hereinafter referred to as a "downlink transmission timing") at which the base station 200 transmits the downlink signal. For example, the downlink transmission timing is a timing earlier than the downlink reception timing by half of the time corresponding to the TA information of the terminal device 100.

In this way, the D2D transmission timing is later than the downlink transmission timing of the base station. Since the downlink reception timing of the partner device is at least later than the downlink transmission timing, the downlink reception timing and the D2D transmission timing of the partner side are closer. Accordingly, there is a high possibility of the D2D communication signal being properly received. In other words, it is possible to loosen the constraints (for example, the distances between the base station 200, and the reception side device and the transmission side device and the distance between the reception side device and the transmission side device) for proper reception of the D2D communication signal.

As a specific example, the decided D2D transmission timing is a timing (that is, the downlink transmission timing) at which the base station 200 transmits the downlink signal.

In this way, the D2D transmission timing becomes nearly constant between the terminal devices 100. That is, a variation in the D2D transmission timing by the terminal device 100 is small irrespective of the position of each terminal device 100 within the cell 21, a frequency band used for the D2D communication, and a duplex communication scheme (for example, an FDD scheme or a TDD scheme).

As the second example of the D2D transmission timing, the decided D2D transmission timing is the reception timing (that is, the downlink reception timing) at which the terminal device 100 receives the downlink signal.

In general, the terminal devices 100 (for example, the terminals 100A and 100B) performing the D2D communication are located nearby. That is, the distance between the terminal devices 100 is small. Therefore, a difference between the downlink reception timing of the transmission side device and the downlink reception timing of the reception side in the D2D communication is small. Further, in the D2D communication, propagation delay from the transmission side device to the reception side device is small. Accordingly, when the transmission side device (for example, the terminal device 100A) of the D2D communication transmits a D2D communication signal at a downlink reception timing of the own device, the reception side device (for example, the terminal device 100B) can receive the D2D communication signal at a timing close to the downlink reception timing of the own device. Accordingly, there is a high possibility of the D2D communication signal being properly received. In other words, it is possible to loosen the constraints (for example, the distances between the base station 200, and the reception side device and the transmission side device and the distance between the reception side device and the transmission side device) for proper reception of the D2D communication signal.

In this case, information other than the reception timing is not necessary. Accordingly, even when the TA value is not yet acquired (for example, the terminal device 100 does not perform random access and is in an idle state), the terminal device 100 can transmit the D2D communication signal at a proper D2D transmission timing.

As the third example of the D2D transmission timing, the TA information used to decide the timing (that is, the uplink transmission timing of another terminal device 100) at which the other terminal device 100 transmits the uplink signal is further acquired. The D2D transmission timing is decided based on the downlink reception timing of the terminal device 100, the TA information of the terminal device 100, and the TA information of the other terminal device 100.

More specifically, for example, the decided D2D transmission timing is the timing (that is, the downlink reception timing of the other terminal device 100) at which the other terminal device 100 (that is, the reception side terminal device of the D2D communication) receives the downlink signal from the base station 200. For example, the downlink reception timing of the other terminal device 100 is the timing later than a timing (that is, a downlink transmission timing) at which the base station 200 transmits the downlink signal by half of a time corresponding to the TA information of the other terminal device 100.

In general, the terminal devices 100 (for example, the terminals 100A and 100B) performing the D2D communication are located nearby. That is, the distance between the terminal devices 100 is small. Therefore, in the D2D communication, propagation delay from the transmission side device to the reception side device is small. Accordingly, when the transmission side device (for example, the terminal device 100A) of the D2D communication transmits a D2D communication signal at the downlink reception timing of the reception side device (for example, the terminal device 100B), the reception side device can receive the D2D communication signal at the timing close to the downlink reception timing of the own device. Accordingly, there is a high possibility of the D2D communication signal being properly received. In other words, it is possible to loosen the constraints (for example, the distances between the base station 200, and the reception side device and the transmission side device and the distance between the reception side device and the transmission side device) for proper reception of the D2D communication signal.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the example in which the terminal device decides the D2D transmission timing of the own device has been described, but an embodiment of the present disclosure is not limited thereto. For example, as described even in the applications, the D2D transmission timing of the terminal device may be decided by a device forming a part of the base station. For example, in the described example, the information acquisition unit and the transmission timing decision unit included in the terminal device may be included in the base station (or the device forming a part of the base station). The base station may notify the terminal device of the D2D transmission timing.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, terminal device) to exhibit functions similar to each structural element of the foregoing communication control device. It becomes also possible to provide a storage medium which stores the computer program.

Additionally, the present technology may also be configured as below.

(1)

A communication control device including:

an acquisition unit configured to acquire a reception timing at which a second radio communication device receives a downlink signal from a base station performing radio communication with a first radio communication device or the second radio communication device; and a decision unit configured to decide a transmission timing at which the second radio communication device transmits a signal to the first radio communication device through inter-device communication based on the reception timing, wherein the decided transmission timing is a timing later than a timing at which the second radio communication device transmits an uplink signal.

(2)

The communication control device according to (1), wherein the acquisition unit further acquires first timing advance information to decide the timing at which the second radio communication device transmits the uplink signal, and wherein the decision unit decides the transmission timing based on the reception timing and the first timing advance information.

(3)

The communication control device according to (2), wherein the decided transmission timing is a timing earlier than the reception timing.

(4)

The communication control device according to (2) or (3), wherein the decided transmission timing is a timing later than a timing at which the base station transmits the downlink signal.

(5)

The communication control device according to (4), wherein the decided transmission timing is the timing at which the base station transmits the downlink signal.

(6)

The communication control device according to (4) or (5), wherein the timing at which the base station transmits the downlink signal is a timing earlier than the reception timing by half of a time corresponding to the first timing advance information.

(7)

The communication control device according to (1), wherein the decided transmission timing is the reception timing.

(8)

The communication control device according to (2), wherein the acquisition unit further acquires second timing advance information to decide a timing at which the first radio communication device transmits an uplink signal, and wherein the decision unit decides the transmission timing based on the reception timing, the first timing advance information, and the second timing advance information.

(9)

The communication control device according to (8), wherein the decided transmission timing is a timing at which the first radio communication device receives the downlink signal from the base station.

(10)

The communication control device according to (9), wherein the timing at which the first radio communication device receives the downlink signal is a timing later than a timing at which the base station transmits the downlink signal by half of a time corresponding to the second timing advance information.

(11)

The communication control device according to any one of (1) to (10), wherein the first radio communication device and the second radio communication device are located in a same cell, and wherein the base station is a base station of the same cell.

(12)

The communication control device according to any one of (1) to (10), wherein the first radio communication device is located in a first cell, wherein the second radio communication device is located at a second cell different from the first cell, and wherein the base station is a base station of one of the first cell and the second cell.

(13)

The communication control device according to any one of (1) to (12), wherein the first radio communication device and the second radio communication device transmit a signal according to a predetermined radio communication scheme through the inter-device communication and receive a signal according to the predetermined radio communication scheme.

(14)

The communication control device according to (13), wherein the predetermined radio communication scheme is a radio communication scheme used by the base station to transmit the downlink signal.

(15)

The communication control device according to (14), wherein the predetermined radio communication scheme is an orthogonal frequency division multiplexing scheme.

(16)

The communication control device according to any one of (1) to (15), wherein the communication control device is the second radio communication device.

(17)

The communication control device according to any one of (1) to (15), wherein the communication control device is a device forming a part of the base station.

(18)

A program causing a computer to function as:

an acquisition unit configured to acquire a reception timing at which a second radio communication device receives a downlink signal from a base station performing radio communication with a first radio communication device or the second radio communication device; and a decision unit configured to decide a transmission timing at which the second radio communication device transmits a signal to the first radio communication device through inter-device communication based on the reception timing, wherein the decided transmission timing is a timing later than a timing at which the second radio communication device transmits an uplink signal.

(19)
A communication control method including:
  acquiring a reception timing at which a second radio communication device receives a downlink signal from a base station performing radio communication with a first radio communication device or the second radio communication device; and
  deciding a transmission timing at which the second radio communication device transmits a signal to the first radio communication device through inter-device communication based on the reception timing,
  wherein the decided transmission timing is a timing later than a timing at which the second radio communication device transmits an uplink signal.

REFERENCE SIGNS LIST 10 terminal device
20 base station
21 cell
23 macro cell
25 small cell
100 terminal device
110 antenna unit
120 radio communication unit
130 storage unit
140 control unit
141 information acquisition unit
143 transmission timing decision unit
200 base station

The invention claimed is:

1. An electronic device comprising circuitry configured to:
  obtain receiving timing information related to a timing at which a second communication device receives downlink signals from a base station, the base station being configured to communicate with a first communication device and the second communication device in a plurality of cases including a first case and a second case;
  determine whether each of the plurality of cases including the first case and the second case is present based on a predetermined condition, the predetermined condition being based on a first timing advance information corresponding to the second communication device;
  determine a transmitting timing at which the second communication device transmits D2D signals to the first communication device based on the predetermined condition; and control the second communication device to transmit the D2D signals to the first communication device at the transmitting timing;
  wherein the transmitting timing is determined based on the receiving timing information and the first timing advance information in case of the first case according to the predetermined condition, and
  the transmitting timing is delayed to have a deviation, between a D2D reception timing and the receiving timing, less than a length of a cyclic prefix (CP), by having the delayed transmitting timing determined by multiplying the first timing advance information by a coefficient P, where 0<P<1, in case of the second case according to the predetermined condition.

2. The electronic device of claim 1, wherein, in case of the first case, the transmitting timing is determined as prior to a timing indicated by the receiving timing information by a value calculated by multiplying the first timing advance information by a predetermined coefficient.

3. The electronic device of claim 1, wherein, in case of the second case, the transmitting timing is determined without considering which duplex communication scheme is set, FDD scheme or TDD scheme.

4. The electronic device of claim 1, wherein, in case of a third case according to the predetermined condition, the transmitting timing is determined based on the receiving timing information, the first timing advance information and a second timing advance information different from the first timing advance information.

5. The electronic device of claim 1, wherein the predetermined condition corresponds to a condition related to positions of the first communication device or the second communication device.

6. The electronic device of claim 1, wherein the predetermined condition corresponds to a condition related to whether the first communication device and the second communication device are located in a same cell or not.

7. The electronic device of claim 6, wherein the circuitry is configured to obtain the receiving timing information from a base station different from a base station providing a cell which the second communication device belongs to.

8. The electronic device of claim 1, wherein the predetermined condition corresponds to a condition related to whether the first communication device and the second communication device belong to a same timing advance group or not.

9. The electronic device of claim 1, wherein the transmitting timing is determined as a timing later than a timing at which the second communication device transmits an uplink signal.

10. The electronic device of claim 9, wherein the timing is further later than a timing at which the base station transmits the downlink signal.

11. The electronic device of claim 1, wherein the circuitry is configured as a component of the second communication device.

12. Wireless communication method comprising:
  obtaining, using circuitry, receiving timing information related to a timing at which a second communication device receives downlink signals from a base station, the base station being configured to communicate with a first communication device and the second communication device in a plurality of cases including a first case and a second case;
  determining, using the circuitry, a transmitting timing at which the second communication device transmit D2D signals to the first communication device based on a predetermined condition;
  determining, using the circuitry, whether each of the plurality of cases including the first case and the second case is present based on a predetermined condition, the predetermined condition being based on a first timing advance information corresponding to the second communication device;
  determining, using the circuitry, a transmitting timing at which the second communication device transmits D2D signals to the first communication device based on the predetermined condition; and
  controlling, using the circuitry, the second communication device to transmit the D2D signals to the first communication device at the transmitting timing;
  wherein the transmitting timing is delayed to have a deviation, between a D2D reception timing and the receiving timing, less than a length of a cyclic prefix (CP), by having the delayed transmitting timing determined based on the receiving timing information and the first timing advance information in case of the first case according to the predetermined condition, and the transmitting timing is determined by multiplying the first timing advance information by a coefficient P, where 0<P<1, in case of the second case according to the predetermined condition.

* * * * *